(12) United States Patent
Liu et al.

(10) Patent No.: US 11,934,766 B2
(45) Date of Patent: Mar. 19, 2024

(54) ALWAYS ON DISPLAY METHOD AND ELECTRONIC DEVICE

(71) Applicant: HUAWEI TECHNOLOGIES CO., LTD., Shenzhen (CN)

(72) Inventors: Anqi Liu, Shenzhen (CN); Yundie Zhang, Shenzhen (CN); Aibing Liu, Shenzhen (CN); Jing Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/006,839

(22) PCT Filed: Jul. 23, 2021

(86) PCT No.: PCT/CN2021/108074
§ 371 (c)(1),
(2) Date: Jan. 25, 2023

(87) PCT Pub. No.: WO2022/022406
PCT Pub. Date: Feb. 3, 2022

(65) Prior Publication Data
US 2023/0274075 A1    Aug. 31, 2023

(30) Foreign Application Priority Data

Jul. 28, 2020    (CN) .......................... 202010738231.8

(51) Int. Cl.
*G06F 17/00*    (2019.01)
*G06F 3/14*    (2006.01)
*G06F 40/103*    (2020.01)

(52) U.S. Cl.
CPC .............. *G06F 40/103* (2020.01); *G06F 3/14* (2013.01)

(58) Field of Classification Search
CPC .......... G06F 40/103; G06F 3/14; G06F 9/451; H04M 1/724634; H04M 1/72469
See application file for complete search history.

(56) References Cited

U.S. PATENT DOCUMENTS 9,460,530 B2 *  10/2016  Dougherty .............. G06T 11/60
10,353,986 B2 *  7/2019  Elings .................... G06F 40/103
(Continued)

FOREIGN PATENT DOCUMENTS

CN    103365600 A  *  10/2013
CN    103365600 A     10/2013
(Continued)

*Primary Examiner* — Laurie A Ries
(74) *Attorney, Agent, or Firm* — Leydig, Voit & Mayer, Ltd.

(57) ABSTRACT

An always on display method and an electronic device are provided. The method includes: An electronic device obtains text content. The electronic device performs word segmentation processing on the text content to obtain a plurality of word segments. The electronic device determines at least one layout format of the text content based on a quantity of words of the text content, a quantity of the plurality of word segments, and a preset mapping relationship. The at least one layout format includes a first layout format. The electronic device detects a screen lock operation. In response to the screen lock operation, the electronic device displays the text content on an always on display interface based on the first layout format.

16 Claims, 40 Drawing Sheets

(56) References Cited

U.S. PATENT DOCUMENTS

| | | | | |
|---|---|---|---|---|
| 10,691,323 B2* | 6/2020 | Migos | ................ | G06F 3/04883 |
| 11,455,460 B2* | 9/2022 | Tao | ................ | G06V 30/333 |
| 2012/0110441 A1* | 5/2012 | Bellert | ................ | G06F 40/103 |
| | | | | 715/249 |
| 2015/0095768 A1* | 4/2015 | Rimmer | ................ | G06F 40/103 |
| | | | | 715/238 |
| 2015/0106698 A1* | 4/2015 | Albright | ................ | G06F 40/279 |
| | | | | 715/244 |
| 2019/0265886 A1 | 8/2019 | Moon et al. | | |
| 2021/0064691 A1* | 3/2021 | Kandari | ................ | G06F 40/126 |
| 2021/0097143 A1* | 4/2021 | Dozier, III | ................ | G06F 40/42 |
| 2022/0319219 A1* | 10/2022 | Tsibulevskiy | ................ | G06T 3/60 |

FOREIGN PATENT DOCUMENTS

| | | | | | |
|---|---|---|---|---|---|
| CN | 105701082 A | | 6/2016 | | |
| CN | 105892981 A | | 8/2016 | | |
| CN | 107404576 A | | 11/2017 | | |
| CN | 107451113 A | | 12/2017 | | |
| CN | 109189879 A | * | 1/2019 | ............ | G06T 11/60 |
| CN | 109189879 A | | 1/2019 | | |
| CN | 110023927 A | | 7/2019 | | |
| CN | 110264545 A | | 9/2019 | | |
| CN | 110798636 A | | 2/2020 | | |

* cited by examiner (a)

(b)

(c)

ALWAYS ON DISPLAY METHOD AND ELECTRONIC DEVICE

CROSS-REFERENCE TO RELATED APPLICATIONS

This application is a National Stage of International Application No. PCT/CN2021/108074, filed on Jul. 23, 2021, which claims priority to Chinese Patent 202010738231.8, filed on Jul. 28, 2020. Both of the aforementioned applications are hereby incorporated by reference in their entireties.

TECHNICAL FIELD

This application relates to the terminal field, and more specifically, to an always on display method and an electronic device.

BACKGROUND

Currently, always on display (always on display, AOD) of a user's personalized signature on a mobile terminal device has become a major trend in the industry, to improve personalization and playability of a mobile phone. Currently, an always on display interface of a mobile terminal generally displays information such as a date, time, and a battery level, and a style of the information on the always on display interface is always the same, and is relatively simple.

SUMMARY

This application provides an always on display method and an electronic device, so that text content can be automatically laid out on an always on display interface. This helps improve user experience of viewing the always on display interface.

According to a first aspect, an always on display method is provided. The method is applied to an electronic device. The method includes: The electronic device obtains text content. The electronic device performs word segmentation processing on the text content to obtain a plurality of word segments. The electronic device determines at least one layout format of the text content based on a quantity of words of the text content, a quantity of the plurality of word segments, and a preset mapping relationship. The preset mapping relationship is a mapping relationship between a quantity of words, a quantity of word segments, and a layout format. The at least one layout format includes a first layout format. The electronic device detects a screen lock operation of a user. In response to the screen lock operation, the electronic device displays the text content on a first always on display interface based on the first layout format.

In this embodiment of this application, the electronic device may determine the at least one layout format based on the text content and the mapping relationship, and select the first layout format in the at least one layout format to lay out the text content. In this way, the electronic device can automatically implement layout of the text content without a need to select a layout format by the user. This helps improve user experience of viewing the always on display interface.

With reference to the first aspect, in some implementations of the first aspect, the method further includes: When entering anon-always on display interface from the first always on display interface, and entering a second always on display interface from the non-always on display interface, the electronic device displays the text content on the second always on display interface based on a second layout format. The at least one layout format includes the second layout format. The first layout format is different from the second layout format.

In this embodiment of this application, the electronic device may determine a plurality of layout formats based on a quantity of words, a quantity of word segments, and a mapping relationship. When the electronic device enters the always on display interface, the electronic device may display a layout format different from that when the electronic device enters the always on display interface last time. In this way, a rich visual effect of a same text can be implemented without user customization. This helps improve user experience.

In some possible implementations, when the electronic device enters the second always on display interface, font information (for example, font color or a font size) of the text content displayed based on the second layout format is different from font information of the text content displayed based on the first layout format.

With reference to the first aspect, in some implementations of the first aspect, the first layout format includes a first part and a second part. The plurality of word segments are located in the first part and the second part. When the first part and the second part are distributed from top to bottom, widths of the first part and the second part are equal. Alternatively, when the first part and the second part are distributed from left to right, heights of the first part and the second part are equal.

In this embodiment of this application, when the text content is laid out from top to bottom, widths of the first part and the second part are equal. When the text content is laid out from left to right, the heights of the first part and the second part are equal. This helps to enrich visual effect, and further helps enhance user experience.

With reference to the first aspect, in some implementations of the first aspect, a quantity of words included in the first part is greater than a quantity of words included in the second part, and a font weight value in the first part is less than a font weight value in the second part.

In this embodiment of this application, a font weight value in the first part with a relatively large quantity of words is less than a font weight value in the second part with a relatively small quantity of words. This helps to enrich visual effect, and further helps enhance user experience.

With reference to the first aspect, in some implementations of the first aspect, the first layout format includes a first part, a second part, and a third part. The plurality of word segments are located in the first part, the second part, and the third part. When the first part and the second part are distributed from top to bottom, and the first part and the second part are both located on the left or right side of the third part, widths of the first part and the second part are equal, and a sum of heights of the first part and the second part is equal to a height of the third part. Alternatively, when the first part and the second part are distributed from left to right, and the first part and the second part are both located above or below the third part, heights of the first part and the second part are equal, and a sum of widths of the first part and the second part is equal to a width of the third part.

In this embodiment of this application, for the three-segment layout, sizes of parts may be set based on different types of the three-segment layout. This helps to enrich visual effect, and further helps enhance user experience.

With reference to the first aspect, in some implementations of the first aspect, a quantity of words included in the third part is greater than a quantity of words included in the first part, and a font weight value in the third part is less than a font weight value in the first part.

In this embodiment of this application, a font weight value in the third part with a relatively large quantity of words is less than a font weight value in the first part with a relatively small quantity of words. This helps to enrich visual effect, and further helps enhance user experience.

With reference to the first aspect, in some implementations of the first aspect, a ratio of a screen width occupied by the text content laid out based on the first layout format to a screen width of the electronic device is a preset value.

In this embodiment of this application, the screen width occupied by the text content laid out based on the first layout format is in a preset proportion to the screen width of the electronic device. This helps to enrich visual effect, and further helps enhance user experience.

According to a second aspect, an always on display apparatus is provided. The apparatus has a function of implementing the electronic device according to the first aspect and the possible implementations of the first aspect. The function may be implemented by hardware, or may be implemented by executing corresponding software by hardware. The hardware or the software includes one or more modules or units corresponding to the foregoing function.

According to a third aspect, an electronic device is provided, including one or more processors, a memory, and one or more computer programs. The one or more computer programs are stored in the memory. The one or more computer programs include instructions. When the instructions are executed by the electronic device, the electronic device is enabled to perform the always on display method according to any possible implementation of the first aspect.

According to a fourth aspect, a chip system is provided. The chip system is located in an electronic device, the chip system includes a system on chip SOC, and the SOC is configured to perform the always on display method according to any possible implementation of the first aspect.

According to a fifth aspect, a computer storage medium is provided, including computer instructions. When the computer instructions are run on an electronic device, the electronic device is enabled to perform the always on display method according to any possible implementation of the first aspect.

According to a sixth aspect, a computer program product is provided. When the computer program product runs on an electronic device, the electronic device is enabled to perform the always on display method according to any possible implementation of the first aspect.

DESCRIPTION OF EMBODIMENTS

The following describes the technical solutions in embodiments of this application with reference to the accompanying drawings in embodiments of this application. In description in embodiments of this application, "I" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the description in embodiments of this application, "a plurality of" means two or more than two.

The terms "first" and "second" mentioned below are merely intended for a purpose of description, and shall not be understood as an indication or implication of relative importance or implicit indication of the number of indicated technical features. Therefore, a feature limited by "first" or "second" may explicitly or implicitly include one or more features. In the descriptions of embodiments, unless otherwise specified, "a plurality of" means two or more.

A method provided in embodiments of this application may be applied to an electronic device, for example, a mobile phone, a tablet computer, a wearable device, a vehicle-mounted device, an augmented reality (augmented reality, AR) device/a virtual reality (virtual reality, VR) device, a notebook computer, an ultra-mobile personal computer (ultra-mobile personal computer, UMPC), a netbook, or a personal digital assistant (personal digital assistant, PDA). A specific type of the electronic device is not limited in embodiments of this application.

Figure 1:
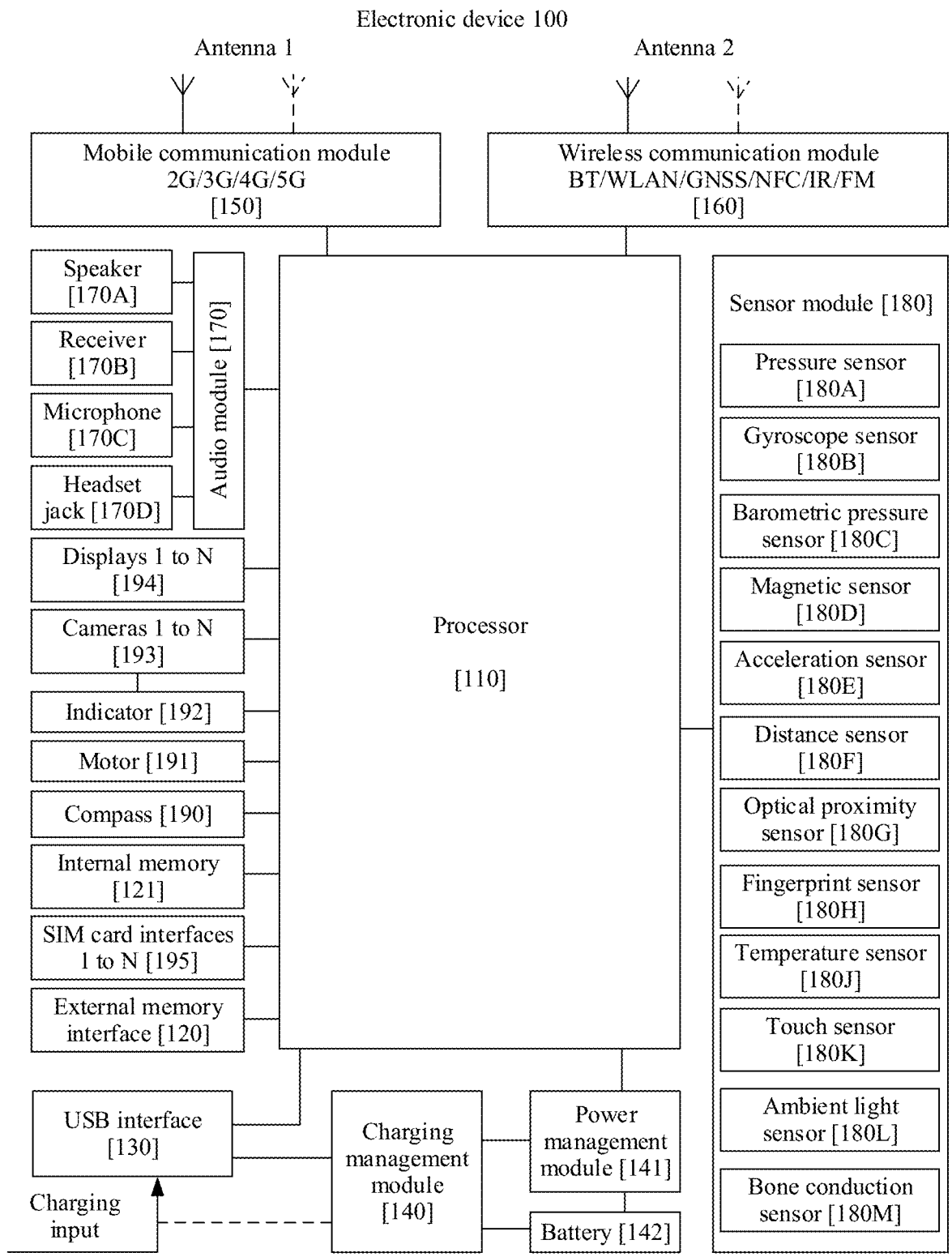
FIG. 1 is a schematic diagram of a structure of an electronic device according to an embodiment of this application.

For example, FIG. 1 is a schematic diagram of a structure of an electronic device 100. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application constitutes no specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the electronic device 100. The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store an instruction or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes one serial data line (serial data line, SDA) and one serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be used to perform audio communication, and sample, quantize, and code an analog signal. In some embodiments, the audio module 170 may be coupled to the wireless communication module 160 through a PCM bus interface. In some embodiments, the audio module 170 may also transmit an audio signal to the wireless communication module 160 through the PCM interface, to implement a function of answering a call through a Bluetooth headset. Both the I2S interface and the PCM interface may be used for audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 via the CSI, to implement a photographing function of the electronic device 100. The processor 110 communicates with the display 194 via the DSI interface, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communication module 160, the audio module 170, the sensor module 180, or the like. The GPIO interface may alternatively be configured as an I2C interface, an I2S interface, a UART interface, an MIPI interface, or the like.

The USB interface 130 is an interface that conforms to a USB standard specification, and may be specifically a mini USB interface, a micro USB interface, a USB type-C interface, or the like. The USB interface 130 may be configured to connect to a charger to charge the electronic device 100, or may be configured to transmit data between the electronic device 100 and a peripheral device, or may be configured to connect to a headset for playing audio through the headset. The interface may be further configured to connect to another electronic device such as an AR device.

It may be understood that an interface connection relationship between the modules shown in this embodiment of this application is merely an example for description, and constitutes no limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive charging input from a wired charger through the USB interface 130. In some embodiments of wireless charging, the charging management module 140 may receive a wireless charging input through a wireless charging coil of the electronic device 100. The charging management module 140 supplies power to the electronic device through the power management module 141 while charging the battery 142.

The power management module 141 is configured to connect to the battery 142, the charging management module 140, and the processor 110. The power management module 141 receives input of the battery 142 and/or the charging management module 140, to supply power to the processor 110, the internal memory 121, an external memory, the display 194, the camera 193, the wireless communication module 160, and the like. The power management module 141 may be configured to monitor parameters such as a battery capacity, a battery cycle count, and a battery state of health (electric leakage or impedance). In some other embodiments, the power management module 141 may alternatively be disposed in the processor 110. In some other embodiments, the power management module 141 and the charging management module 140 may alternatively be disposed in a same component.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution that includes 2G/3G/4G/5G or the like and that is applied to the electronic device 100. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering and amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules in the mobile communication module 150 and at least some modules of the processor 110 may be disposed in a same component.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by an audio device (which is not limited to the speaker 170A, the receiver 170B, or the like), or displays an image or a video by the display 194. In some embodiments, the modem processor may be an independent component. In some other embodiments, the modem processor may be independent of the processor 110, and is disposed in a same device as the mobile communication module 150 or another function module.

The wireless communication module 160 may provide a wireless communication solution that is applied to the electronic device 100, and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communication module 160 may be one or more components integrating at least one communication processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the electronic device 100, the antenna 1 and the mobile communication module 150 are coupled, and the antenna 2 and the wireless communication module 160 are coupled, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GNSS), a BeiDou navigation satellite system (BeiDou navigation satellite system, BDS), a quasi-zenith satellite system (quasi-zenith satellite system, QZSS), and/or a satellite based augmentation system (satellite based augmentation systems, SBAS).

The electronic device 100 may implement a display function through the GPU, the display 194, the application processor, and the like. The GPU is a microprocessor for image processing, and is connected to the display 194 and the application processor. The GPU is configured to perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light emitting diode, AMOLED), a flexible light-emitting diode (flexible light-emitting diode, FLED), a mini-LED, a micro-LED, a micro-OLED, a quantum dot light-emitting diode (quantum dot light-emitting diode, QLED), or the like. In some embodiments, the electronic device 100 may include one or N displays 194, where N is a positive integer greater than 1.

The electronic device 100 may implement a photographing function through the camera 193, the ISP, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation on frequency energy.

The video codec is configured to compress or decompress a digital video. The electronic device 100 may support one or more video codecs. In this way, the electronic device 100 can play or record videos in a plurality of encoding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transfer between human brain neurons, and may further continuously perform self-learning. The NPU can implement applications such as intelligent cognition of the electronic device 100, for example, image recognition, facial recognition, speech recognition, and text understanding.

The external memory interface 120 may be used to connect to an external storage card, for example, a micro SD card, to extend a storage capability of the electronic device 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various function applications of the electronic device 100 and data processing. The internal memory 121 may include a program storage area and a data storage area. The program storage area may store an operating system, an application required by at least one function (for example, a voice playing function or an image playing function), and the like. The data storage area may store data (such as audio data and a phone book) created when the electronic device 100 is used, and the like. In addition, the internal memory 121 may include a high-speed random access memory, or may include a nonvolatile memory, for example, at least one magnetic disk storage device, a flash memory device, or a universal flash storage (universal flash storage, UFS).

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to encode and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The electronic device 100 may be configured to listen to music or answer a call in a hands-free mode over the speaker 170A.

The receiver 170B, also referred to as an "earpiece", is configured to convert an electrical audio signal into a sound signal. When a call is answered or voice information is received by using the electronic device 100, the receiver 170B may be put close to a human ear to receive a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, so as to implement a directional recording function and the like.

The headset jack 170D is configured to connect to a wired headset. The headset jack 170D may be the USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a change in the capacitance. When a touch operation is performed on the display 194, the electronic device 100 detects intensity of the touch operation by using the pressure sensor 180A. The electronic device 100 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating a new SMS message is performed.

The gyroscope sensor 180B may be configured to determine a moving posture of the electronic device 100. In some embodiments, angular velocities of the electronic device 100 around three axes (namely, axes x, y, and z) may be determined by using the gyroscope sensor 180B. The gyroscope sensor 180B may be configured to implement image stabilization during photographing. For example, when the shutter is pressed, the gyroscope sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyroscope sensor 180B may also be used in a navigation scenario and a somatic game scenario.

The barometric pressure sensor 180C is configured to measure barometric pressure. In some embodiments, the electronic device 100 calculates an altitude through the barometric pressure measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a flip cover based on the magnetic sensor 180D. Further, a feature such as automatic unlocking upon opening of the flip cover is set based on a detected opening or closing state of the flip cover.

The acceleration sensor 180E may detect accelerations in various directions (usually on three axes) of the electronic device 100. When the electronic device 100 is still, a magnitude and a direction of gravity may be detected. The acceleration sensor 180E may be further configured to identify a posture of the electronic device, and is used in an application such as switching between a landscape mode and a portrait mode or a pedometer.

The distance sensor 180F is configured to measure a distance. The electronic device 100 may measure the distance in an infrared manner or a laser manner. In some embodiments, in a photographing scenario, the electronic device 100 may measure a distance through the distance sensor 180F to implement quick focusing.

The optical proximity sensor 180G may include, for example, a light-emitting diode (LED) and an optical detector such as a photodiode. The light-emitting diode may be an infrared light-emitting diode. The electronic device 100 emits infrared light by using the light-emitting diode. The electronic device 100 detects infrared reflected light from a nearby object through the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear to make a call, to automatically perform screen-off for power saving. The optical proximity sensor 180G may also be used for automatic screen unlocking and locking in a smart cover mode or a pocket mode.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy through the temperature detected by the temperature sensor 180J. For example, when the temperature reported by the temperature sensor 180J exceeds a threshold, the electronic device 100 lowers performance of a processor nearby the temperature sensor 180J, to reduce power consumption for thermal protection. In some other embodiments, when the temperature is less than another threshold, the electronic device 100 heats the battery 142 to prevent the electronic device 100 from being shut down abnormally due to a low temperature. In some other embodiments, when the temperature is lower than still another threshold, the electronic device 100 boosts an output voltage of the battery 142 to avoid abnormal shutdown caused by a low temperature.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor. The touch sensor may transfer the detected touch operation to the application processor to determine a type of the touch event. A visual output related to the touch operation may be provided on the display 194. In some other embodiments, the touch sensor 180K may also be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a key input, and generate a key signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio playback) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 is also compatible with an external storage card. The electronic device 100 interacts with a network through the SIM card, to implement functions such as conversation and data communication. In some embodiments, the electronic device 100 uses an eSIM, namely, an embedded SIM card. The eSIM card may be embedded into the electronic device 100, and cannot be separated from the electronic device 100.

A software system of the electronic device 100 may use a layered architecture, an event-driven architecture, a microkernel architecture, a micro service architecture, or a cloud architecture. In embodiments of this application, an Android system with a layered architecture is used as an example to describe a software structure of the electronic device 100.

Figure 2:
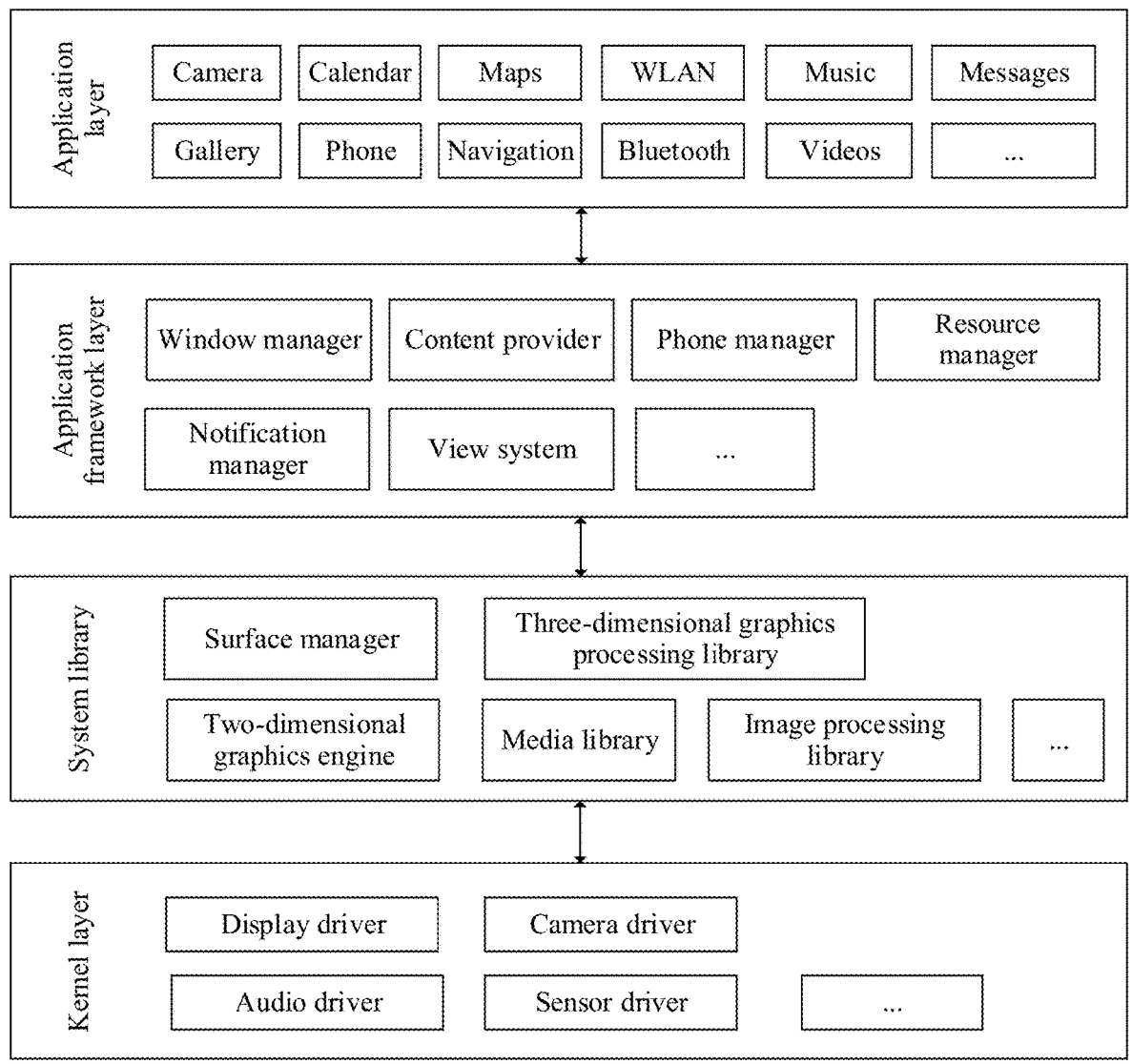
FIG. 2 is a block diagram of a software structure of an electronic device according to an embodiment of this application.

FIG. 2 is a block diagram of a software structure of the electronic device 100 according to this embodiment of this application. In a layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom. The application layer may include a series of application packages.

As shown in FIG. 2, the application packages may include applications such as Camera, Gallery, Calendar, Phone, Maps, Navigation, WLAN, Bluetooth, Music, Videos, and Messages.

The application framework layer provides an application programming interface (application programming interface, API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to store and obtain data, and enable the data to be accessed by an application. The data may include a video, an image, an audio, calls that are made and received, a browsing history, a bookmark, a phone book, and the like.

The view system includes visual controls such as a control for displaying a text and a control for displaying an image. The view system may be configured to construct an application. A display interface may include one or more views. For example, a display interface including an SMS message notification icon may include a text display view and an image display view.

The phone manager is configured to provide a communication function for the electronic device 100, for example, management of a call status (including answering, declining, or the like).

The resource manager provides, for an application, various resources such as a localized character string, an icon, an image, a layout file, and a video file.

The notification manager enables an application to display notification information in a status bar, and may be configured to convey a notification message. The notification manager may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is displayed in the status bar, an announcement is given, the electronic device vibrates, or the indicator light blinks.

The Android runtime includes a kernel library and a virtual machine. The Android runtime is responsible for scheduling and management of the Android system.

The kernel library includes two parts: a function that needs to be invoked in Java language, and a kernel library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (media library), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video coding formats, such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

It should be understood that the technical solutions in embodiments of this application may be applied to systems such as AndroidOS, iOS, and HarmonyOS.

Before the technical solutions in embodiments of this application are described, the technical terms in embodiments of this application are first described.

Always on display (always on display, AOD): The always on display means that a part of a touch screen is still on and information such as time and a notification is displayed when an electronic device is in a screen-locked state. After the electronic device is screen-off, the electronic device can light, by using a self-luminescence feature of the display 194, some areas on the display 194 to display information such as a clock, a date, and a notification, so that a user can view related information in a screen-off state.

FIG. 3(a) to FIG. 3(h) show a group of graphical user interfaces (graphical user interface, GUI) according to an embodiment of this application.

Figure 3A:
FIG. 3(a) to FIG. 3(h) show a group of GUIs according to an embodiment of this application.

Refer to a GUI shown in FIG. 3(a). The GUI is a home screen of a mobile phone. The GUI includes a plurality of application icons, and the plurality of application icons include a Settings icon 301. After detecting an operation that a user taps the Settings icon 301 on the home screen, the mobile phone displays a GUI shown in FIG. 3(b).

In an embodiment, the three virtual buttons at the bottom of the screen of the mobile phone shown in FIG. 3(a) may not be displayed. Alternatively, these buttons are displayed on the home screen after the user has made appropriate settings.

Figure 3B:
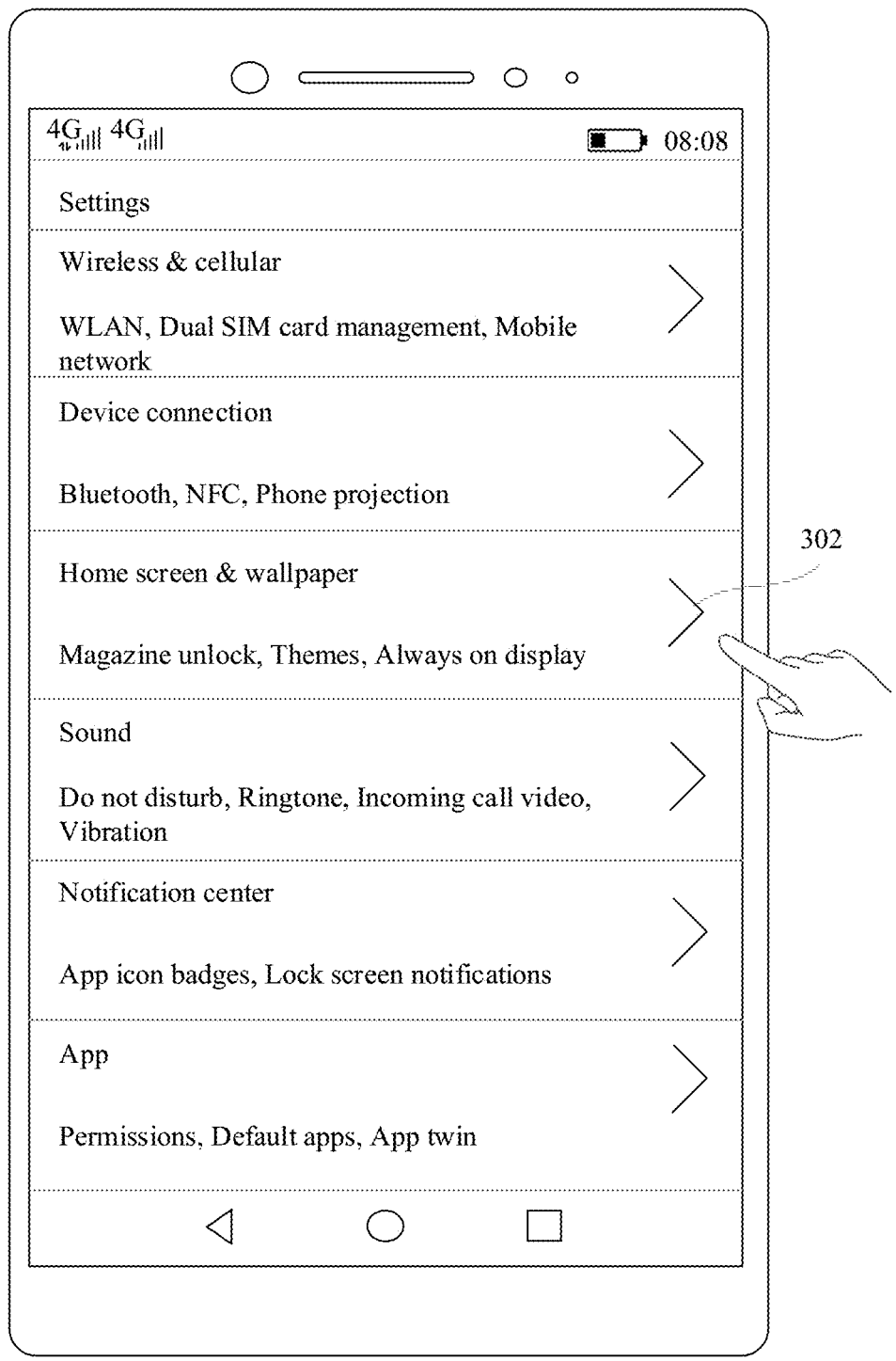

Refer to the GUI shown in FIG. 3(b). The GUI is a setting interface of the mobile phone. The GUI includes a plurality of function options, and the plurality of function options include Wireless & cellular, Device connection, Home screen & wallpaper, Sound, Notification center, Application, Notification, and the like. After detecting an operation that the user taps the Home screen & wallpaper 302, the mobile phone displays a GUI shown in FIG. 3(c).

Figure 3C:
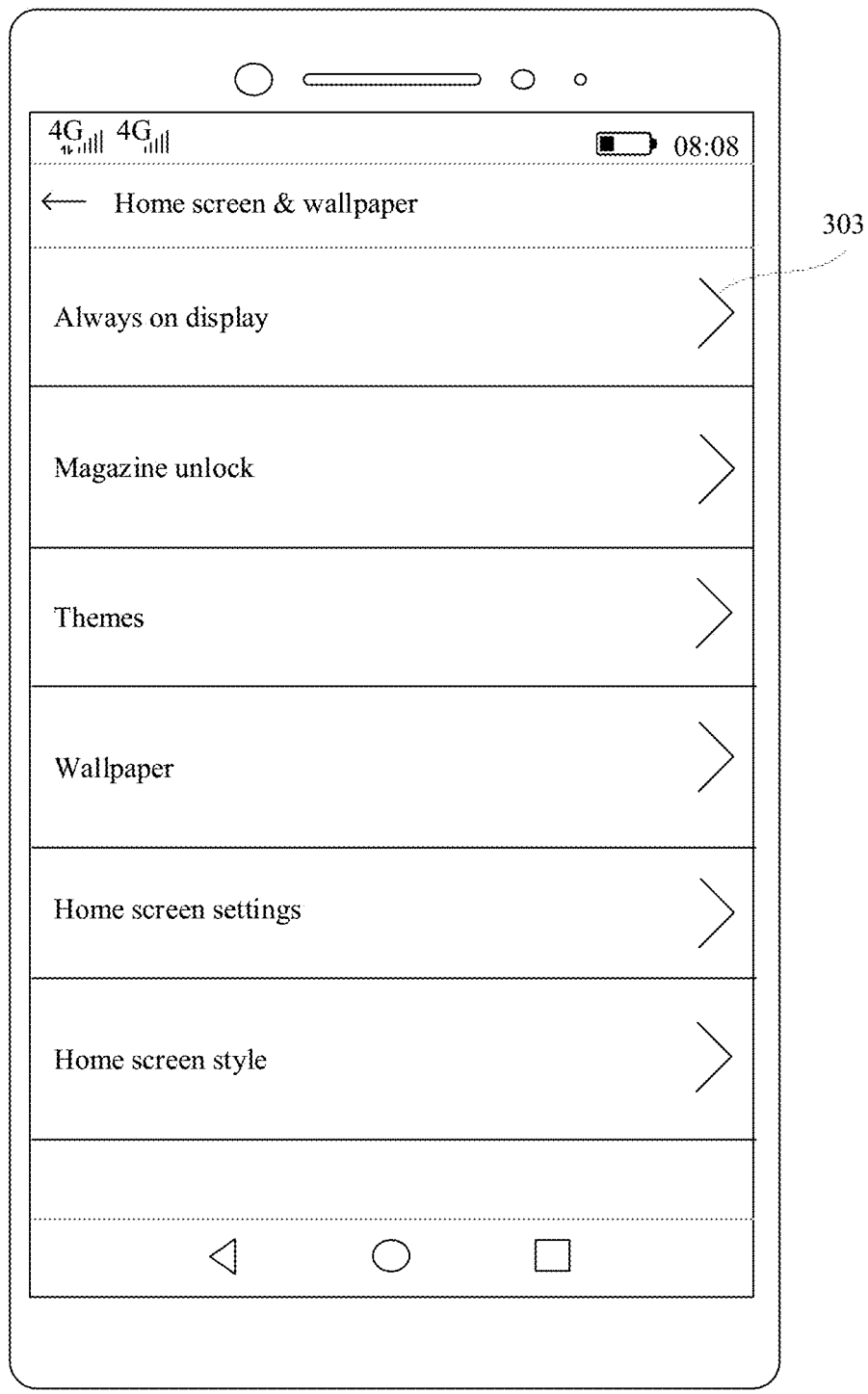

Refer to the GUI shown in FIG. 3(c). The GUI is a function setting interface of Home screen & wallpaper. The setting interface includes setting options such as Always on display, Magazine unlock, Themes, Wallpaper, Home screen setting, and Home screen style. After detecting an operation that the user taps the control 303 corresponding to Always on display, the mobile phone displays a GUI shown in FIG. 3(d).

Figure 3D:
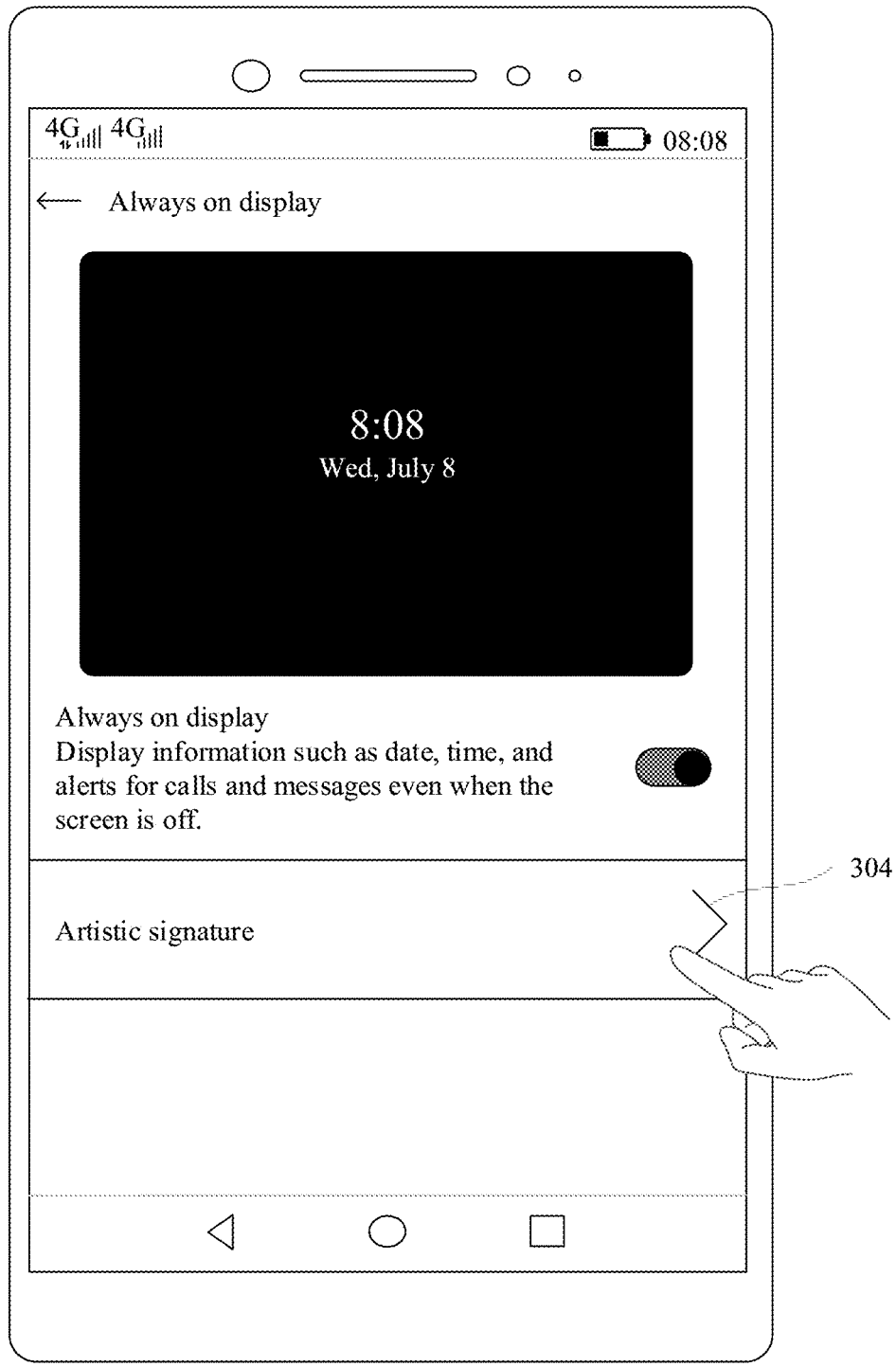

Refer to the GUI shown in FIG. 3(d). The GUI is an always on display setting interface. The setting interface includes an always on display preview interface, an always on display switch control, and a control 304 corresponding to an artistic signature. After an always on display function is enabled, when the mobile phone is screen-off, the mobile phone may display information such as time, a date, and alerts for messages and calls. After detecting an operation that the user taps the control 304, the mobile phone may display a GUI shown in FIG. 3(e).

Figure 3E:
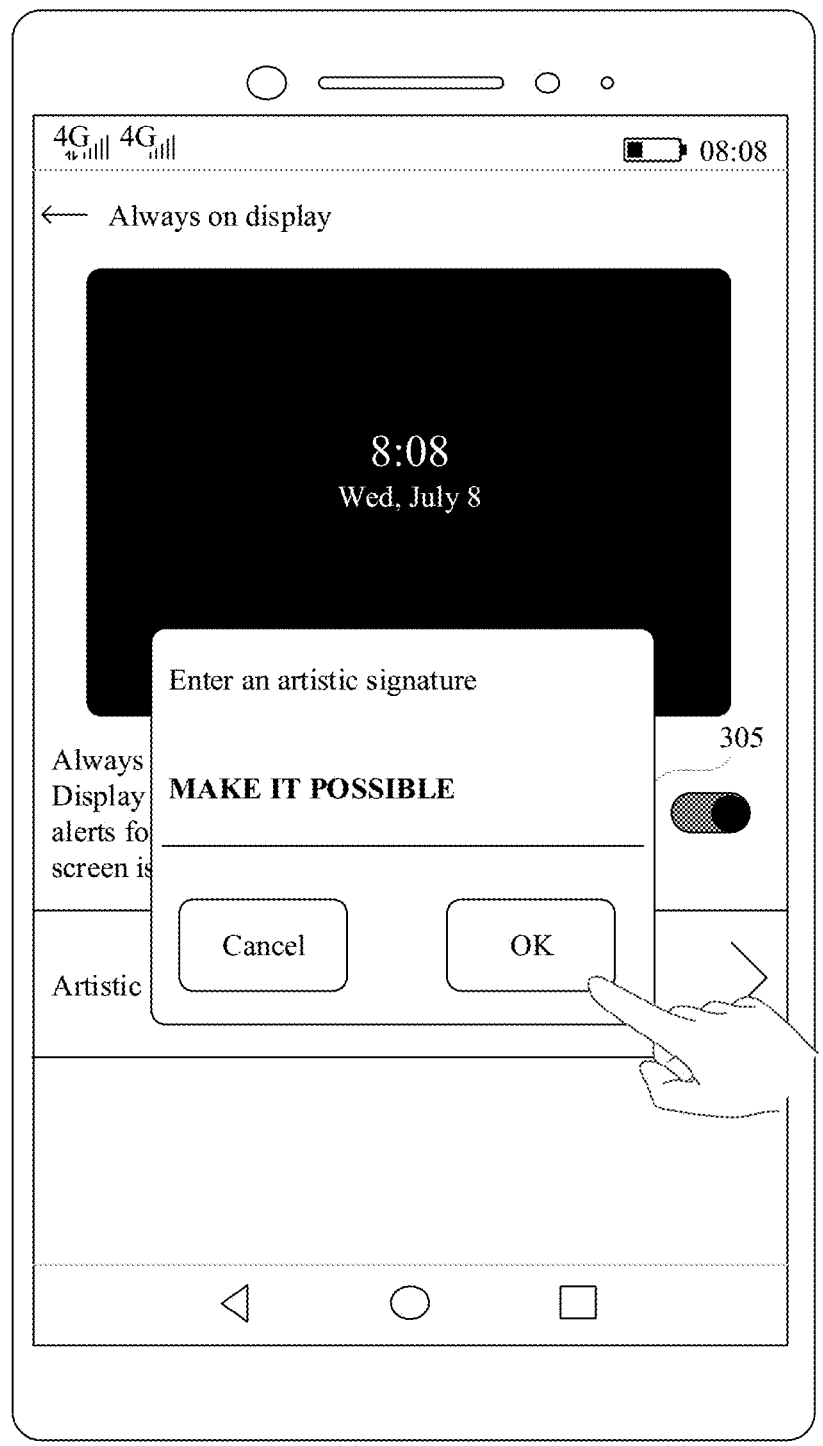

Refer to the GUI shown in FIG. 3(e). After detecting the operation that the user taps the control 304, the mobile phone may pop up a window 305. The mobile phone may prompt the user to enter an artistic signature in the window 305. After detecting operations that the user enters "MAKE IT POSSIBLE" and taps an OK control, the mobile phone may display a GUI shown in FIG. 3(f).

Figure 3F:

Refer to the GUI shown in FIG. 3(f). The GUI is another always on display setting interface. The setting interface includes another always on display preview interface. The preview interface includes an always on display interface after the artistic signature is added. The artistic signature "MAKE IT POSSIBLE" is displayed below information such as time and a date according to the layout as shown in the figure. After the mobile phone enters an always on display state, the mobile phone may display a GUI shown in FIG. 3(g).

It should be understood that, in this embodiment of this application, only the artistic signature "MAKE IT POSSIBLE" may be displayed on the always on display interface, but information such as time and a date is not displayed. Alternatively, on the always on display setting interface, a time period for displaying information such as time and a date may be further set. For example, the user may set a time period for displaying information such as time and a date on the always on display interface to 9:00 a.m. to 6:00 p.m.

Alternatively, on the always on display setting interface, a time period for displaying the artistic signature may be further set. For example, the user may set a time period for displaying the artistic signature on the always on display interface to 8:00 a.m. to 8:00 p.m.

Figure 3G:
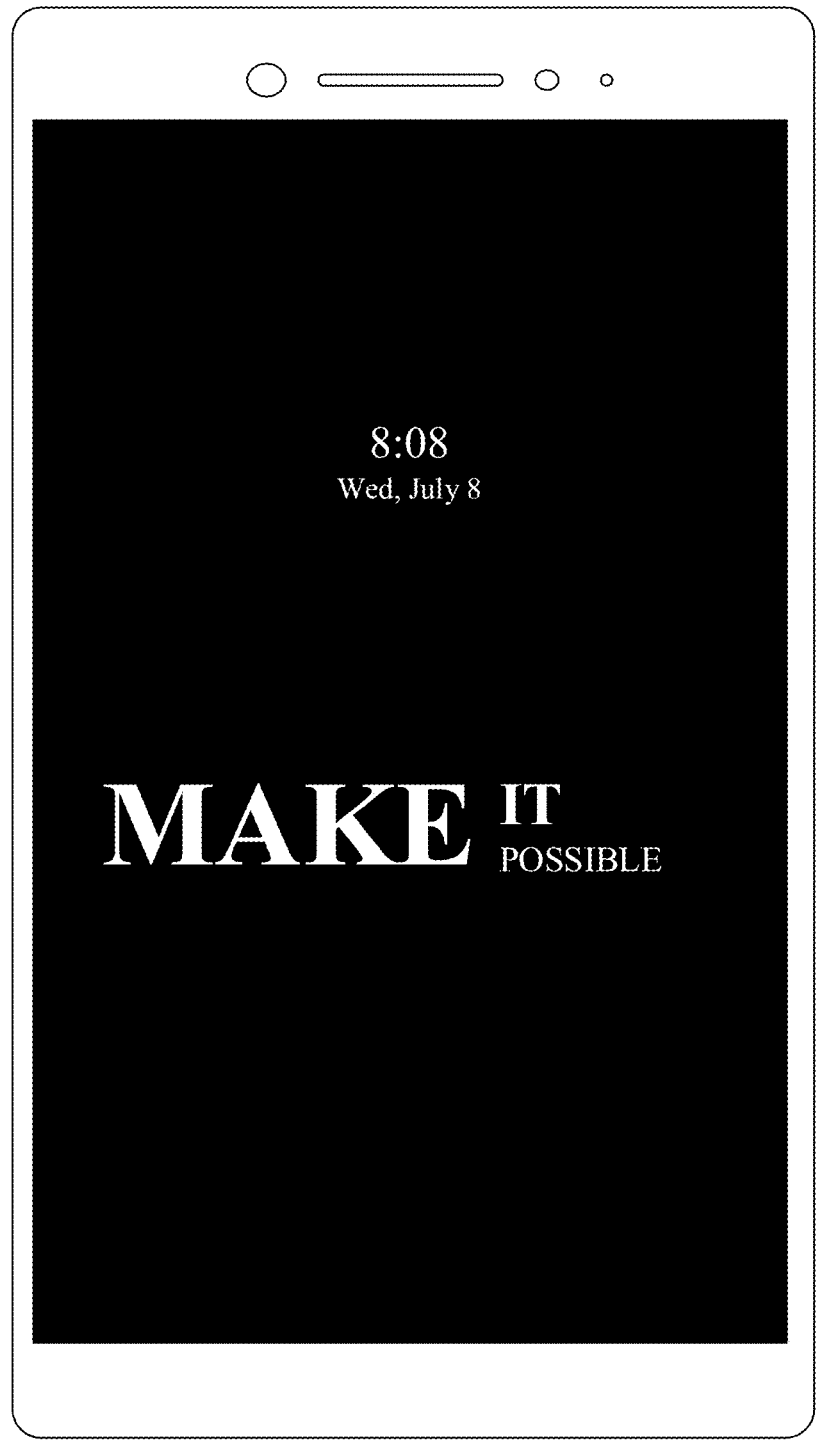

Refer to the GUI shown in FIG. 3(g). The GUI is an always on display interface of the mobile phone after the artistic signature is set. The always on display interface may display information such as a date, time, and an artistic signature.

Figure 3H:
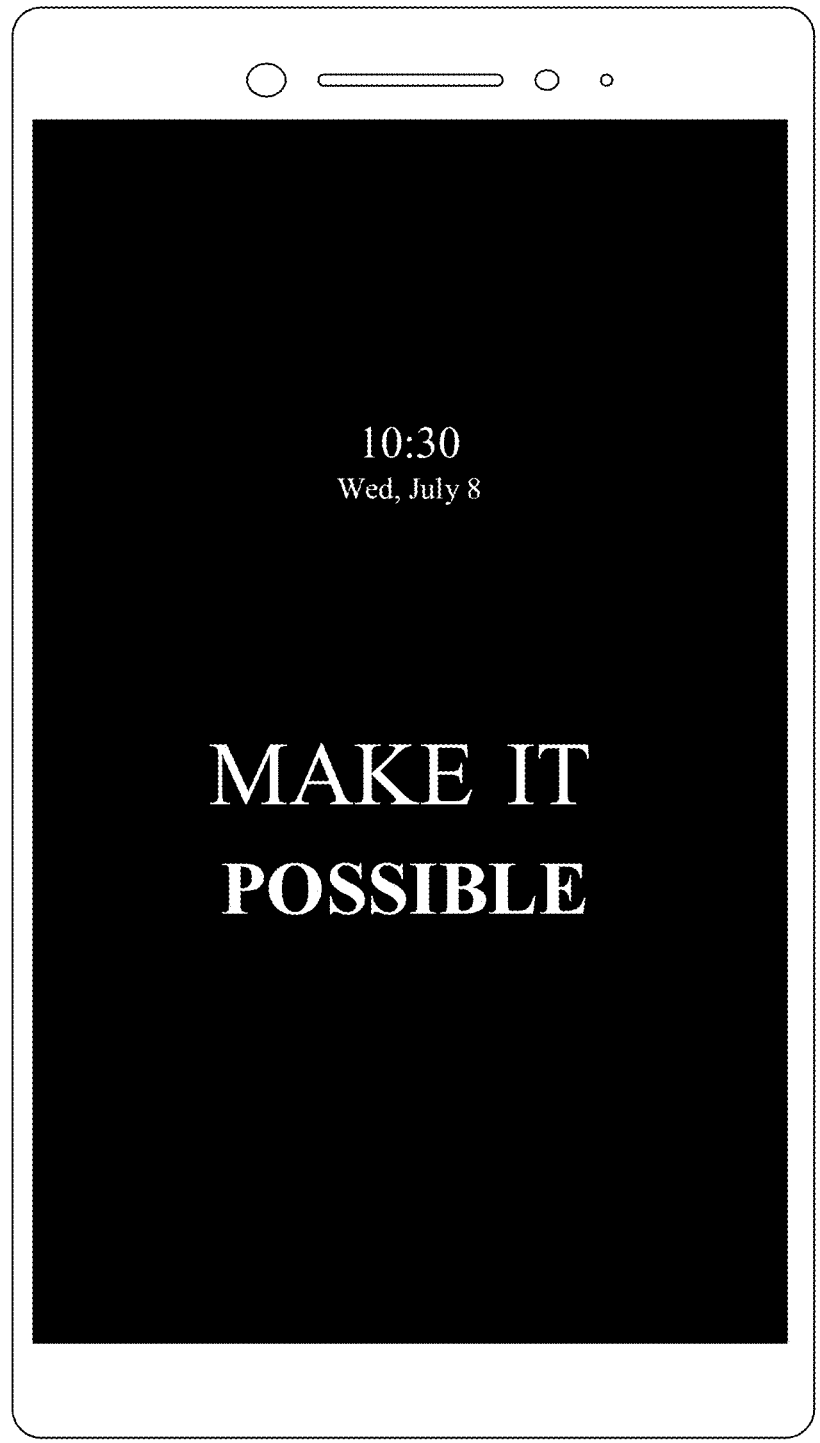

Refer to a GUI shown in FIG. 3(h). The GUI is another always on display interface of the mobile phone. The always on display interface also includes information such as a date, time, and an artistic signature. A layout format of the artistic signature shown in FIG. 3(g) is different from a layout format of the artistic signature shown in FIG. 3(h).

In an embodiment, each time the mobile phone enters the always on display state, the mobile phone may automatically switch a layout format of the artistic signature. In this way, aesthetic fatigue of the user can be avoided. In addition, the user may view a new layout format on each always on display interface. This helps improve user experience.

It should be understood that, in this embodiment of this application, a trigger condition for switching the layout format of the artistic signature on the always on display interface may be:

(1) The mobile phone enters a non-screen-locked state from the always on display state, and then enters the always on display state again.

For example, the mobile phone enters the non-screen-locked state from the always on display interface shown in FIG. 3(g) through password verification, facial recognition, or fingerprint recognition. Then, the mobile phone switches from the non-screen-locked state to the always on display state.

For another example, if the user does not set an unlocking manner such as password verification, facial recognition, or fingerprint recognition, after detecting an operation that the user presses a power button, the mobile phone enters the non-screen-locked state from the always on display state shown in FIG. 3(g). Then, the mobile phone switches from the non-screen-locked state to the always on display state.

(2) The mobile phone enters a screen-on display state from the always on display state, and then enters the always on display state again.

For example, after detecting that the user presses a power button, the mobile phone enters the screen-on state (in the screen-on state, the mobile phone may be in the non-screen-locked state, or the mobile phone may be in a screen-locked state) from the always on display interface shown in FIG. 3(g). Then, the mobile phone switches from the screen-on display state to the always on display state.

It should be understood that the always on display state is relative to a status of the display in this embodiment of this application. That the electronic device is screen-off may be understood as that the electronic device enters the always on display state. The screen-on display state is relative to the always on display state. For example, when the electronic device is in the always on display state and the electronic device detects the operation that the user presses the power button again, the electronic device enters the screen-on display state.

It should be further understood that, in this embodiment of this application, the screen-locked state may be how the electronic device is locked. How the electronic device is locked includes but is not limited to: setting a password by the user, fingerprint recognition, facial recognition, or the like.

For example, when the electronic device is locked, after completing an operation on the home screen of the electronic device, the user may press the power button. After detecting an operation that the user presses the power button, the electronic device enters the screen-locked state. Alternatively, if the electronic device does not detect the user operation within a period of time, the electronic device automatically enters the screen-locked state. When the electronic device is in the screen-locked state, the screen may be off or on. For example, after the user presses the power button, the electronic device may be on and prompt the user to enter a password. In this case, the electronic device is still in the screen-locked state, but the electronic device is screen-on. For example, after another user enters an incorrect password, the electronic device is still in the screen-locked state, but the electronic device is still screen-on.

The non-screen-locked state is relative to the screen-locked state. When the electronic device is in the screen-locked state, the user may unlock the electronic device by entering a password, fingerprint recognition, face recognition, or the like. After being unlocked, the electronic device enters the non-screen-locked state.

It should be further understood that the non-screen-locked state and the screen-on state may also be referred to as a non-always on display state in this embodiment of this application.

FIG. 4(a) to FIG. 4(j) show another group of GUIs according to an embodiment of this application.

Figure 4A:
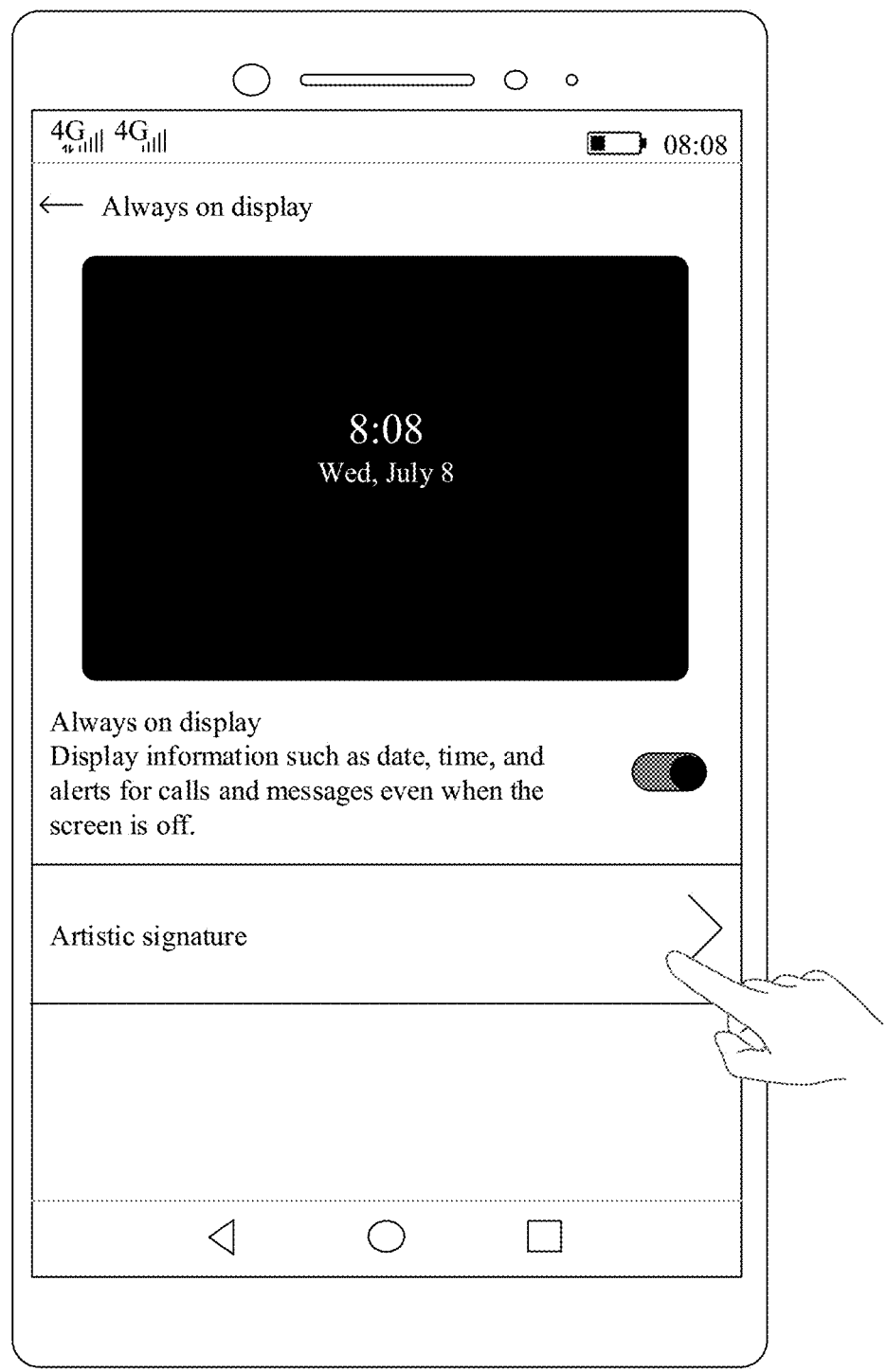
FIG. 4(a) to FIG. 4(j) show another group of GUIs according to an embodiment of this application.

Refer to a GUI shown in FIG. 4(a). The GUI is an always on display setting interface. The setting interface includes an always on display preview interface, an always on display switch control, and a control corresponding to an artistic signature. After detecting an operation that the user taps the control corresponding to the artistic signature, the mobile phone may display a GUI shown in FIG. 4(b).

Figure 4B:
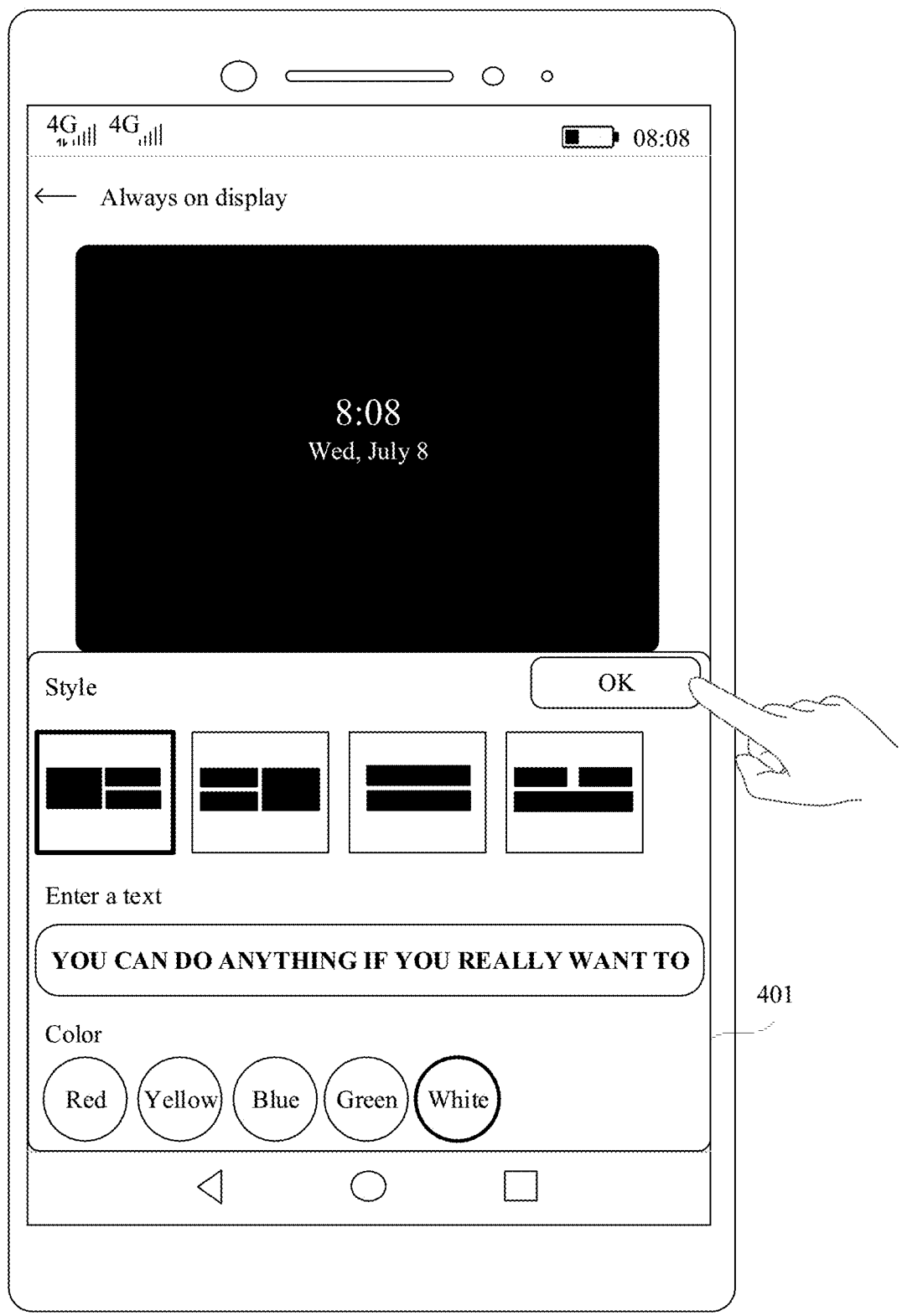

Refer to the GUI shown in FIG. 4(b). After detecting the operation that the user taps the control corresponding to the artistic signature, the mobile phone may pop up a window 401. The window 401 may include functions such as selecting a style of an artistic signature, entering a text, and selecting color of an artistic signature.

Figure 4C:

When the mobile phone detects operations that the user enters an artistic signature in a text input box in the window 401 (for example, "YOU CAN DO ANYTHING IF YOU REALLY WANT TO"), selects a style and color of the artistic signature, and taps an OK control, the mobile phone may display a GUI shown in FIG. 4(c).

In an embodiment, the window 401 may further include more function options such as Font and Font size.

It should be understood that the function option in the window 401 shown in FIG. 4(b) is merely an example. The mobile phone may further provide a function of entering only text information of the artistic signature in the window 401, so that the mobile phone can, by automatically switching an artistic signature layout format, display different artistic signature layout formats each time the mobile phone enters the always on display interface.

The GUI shown in FIG. 4(c) is another always on display setting interface. The setting interface includes another always on display preview interface. The preview interface includes an always on display interface after the artistic signature is added. The artistic signature "YOU CAN DO ANYTHING IF YOU REALLY WANT TO" is displayed below information such as time and a date according to a layout shown in the figure. After the mobile phone enters the always on display state, the mobile phone may display a GUI shown in FIG. 4(d).

Figure 4D:
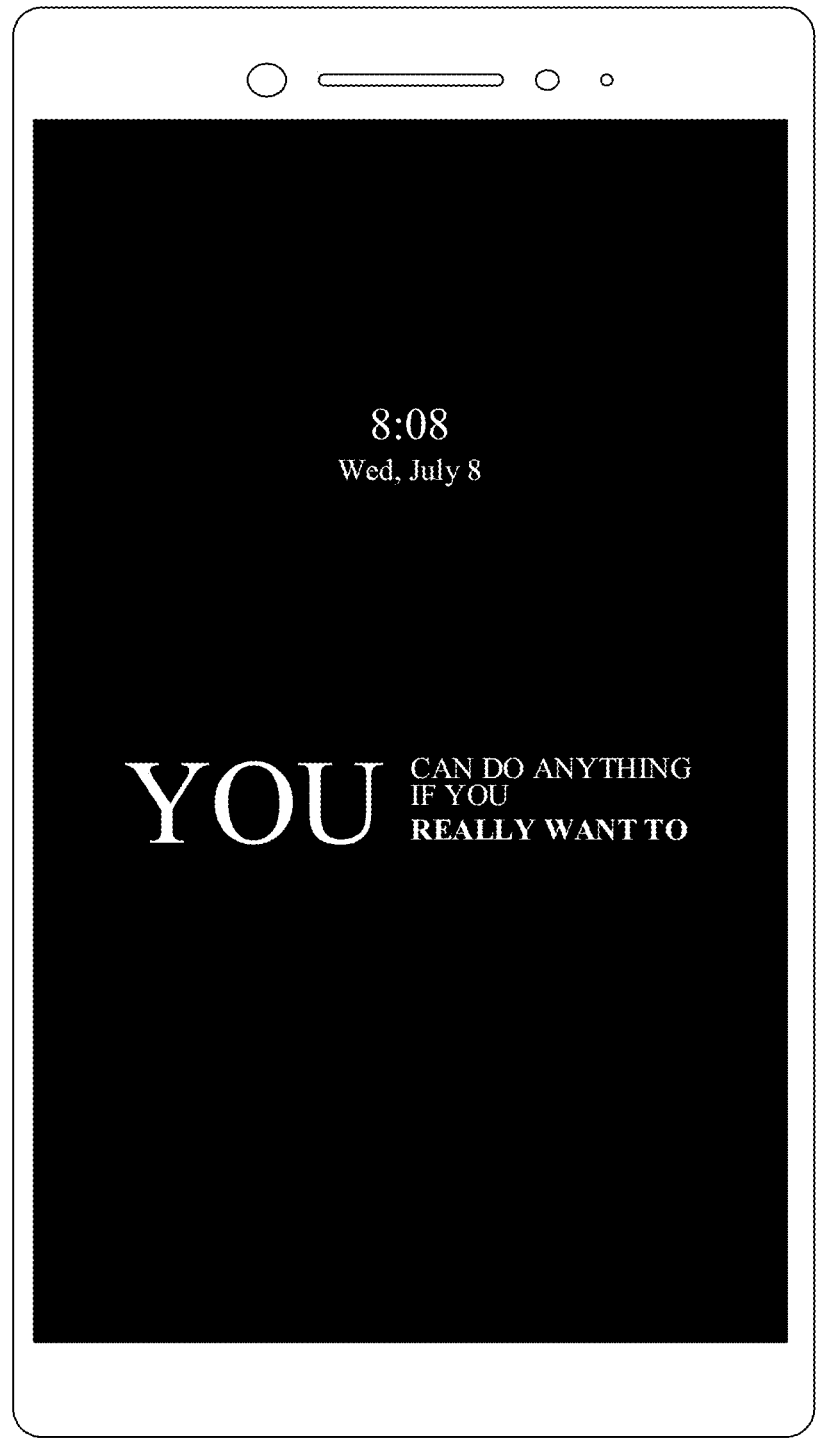

Refer to the GUI shown in FIG. 4(d). The GUI is an always on display interface of the mobile phone after the artistic signature is set. The always on display interface may display information such as a date, time, and an artistic signature. The artistic signature is shown in a three-segment layout format. "YOU" is on the left side, "CAN DO ANYTHING IF YOU" is on the upper right side, and "REALLY WANT TO" is on the lower right side. The overall artistic signature obtained after layout is located below information such as time and a date.

After that, each time the mobile phone enters the always on display interface, the mobile phone may change an artistic signature style (or layout format). For example, FIG. 4(e) to FIG. 4(j) indicate different layout formats that may be displayed on the mobile phone each time the mobile phone enters the always on display interface.

Figure 4E:
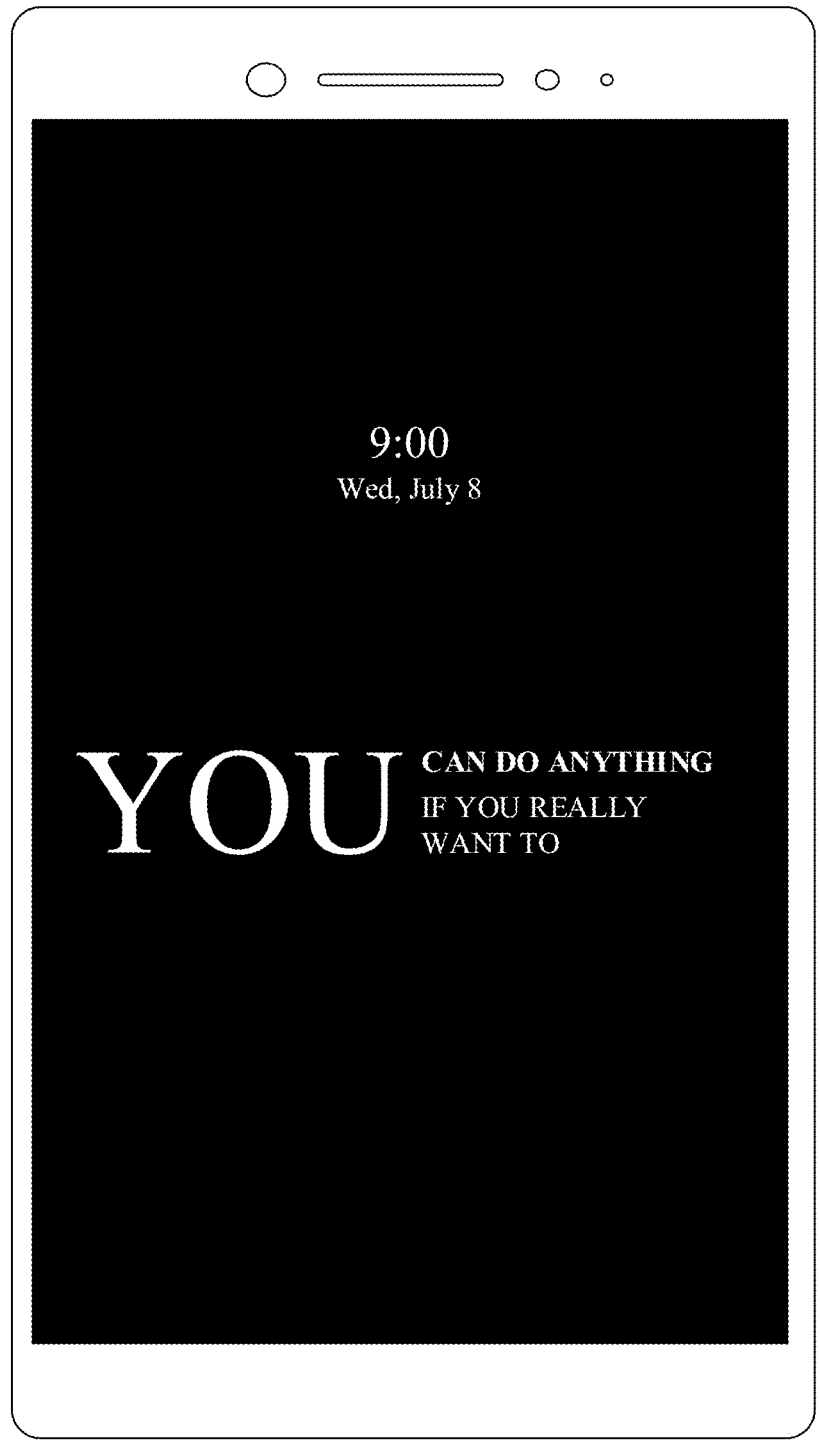

For example, refer to FIG. 4(e). The artistic signature is shown in a three-segment layout format. "YOU" is on the left side, "CAN DO ANYTHING IF YOU REALLY" is on the upper right side, and "WANT TO" is on the lower right side.

Figure 4F:
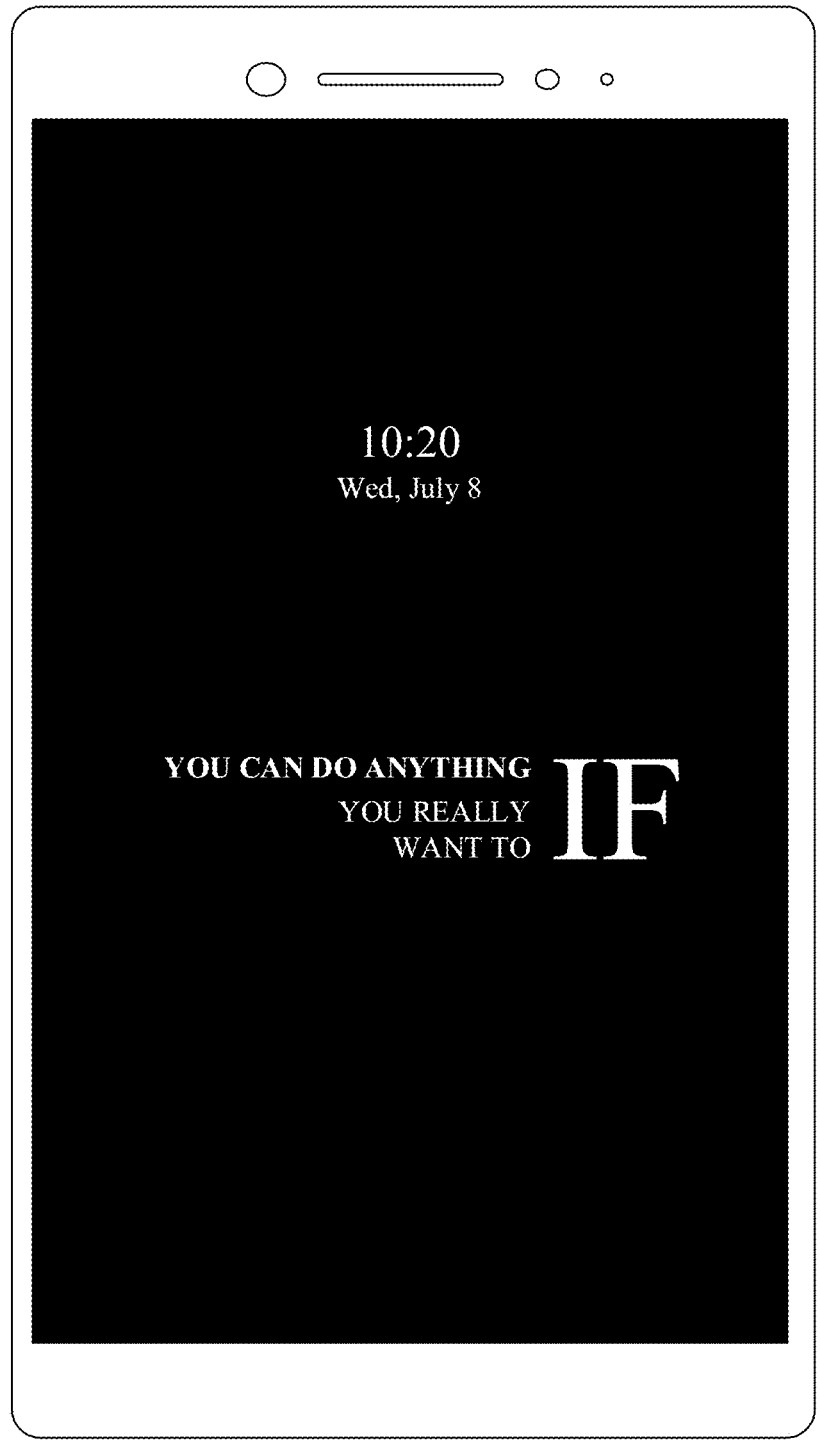

For example, refer to FIG. 4(f). The artistic signature is shown in a three-segment layout format. "IF" is on the right side, "YOU CAN DO ANYTHING YOU REALLY" is on the upper left side, and "WANT TO" is on the lower left side.

Figure 4G:
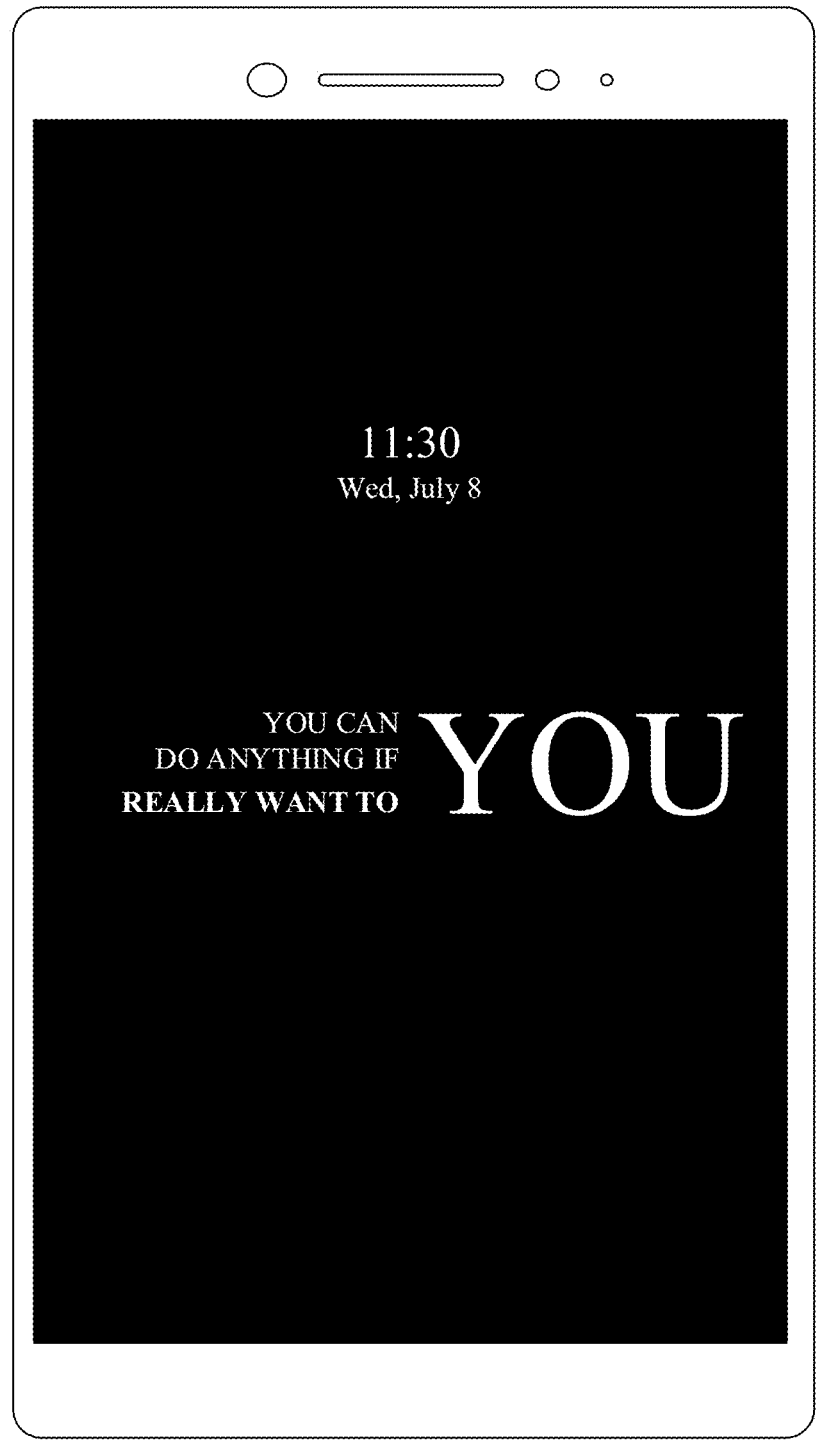

For example, refer to FIG. 4(g). The artistic signature is shown in a three-segment layout format. "YOU" is on the right side, "YOU CAN DO ANYTHING IF" is on the upper left side, and "REALLY WANT TO" is on the lower left side.

Figure 4H:
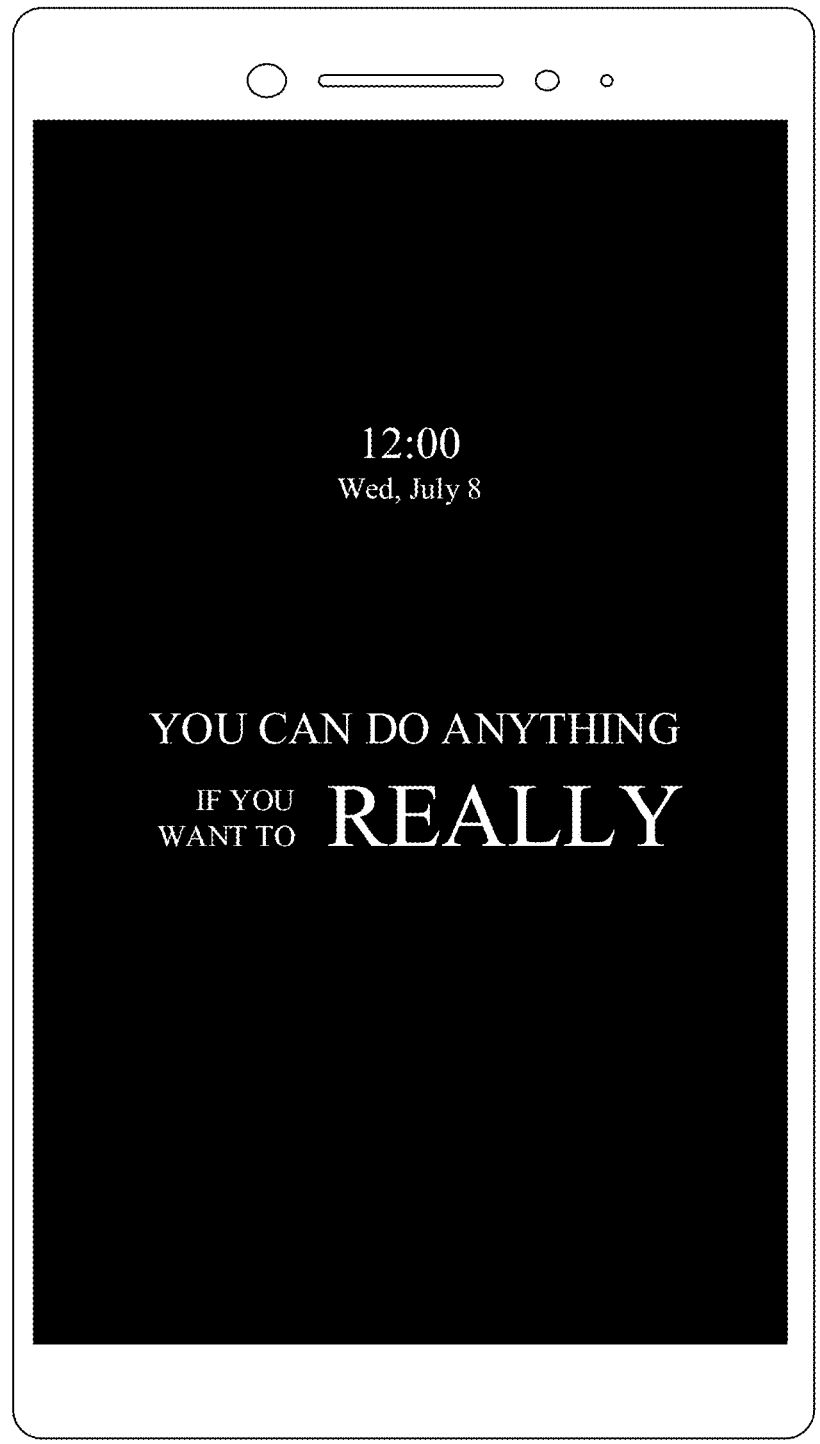

For example, refer to FIG. 4(h). The artistic signature is shown in a three-segment layout format. "YOU CAN DO ANYTHING" is on the upper side, "IF YOU WANT TO" is on the lower left side, and "REALLY" is on the lower right side.

Figure 4I:
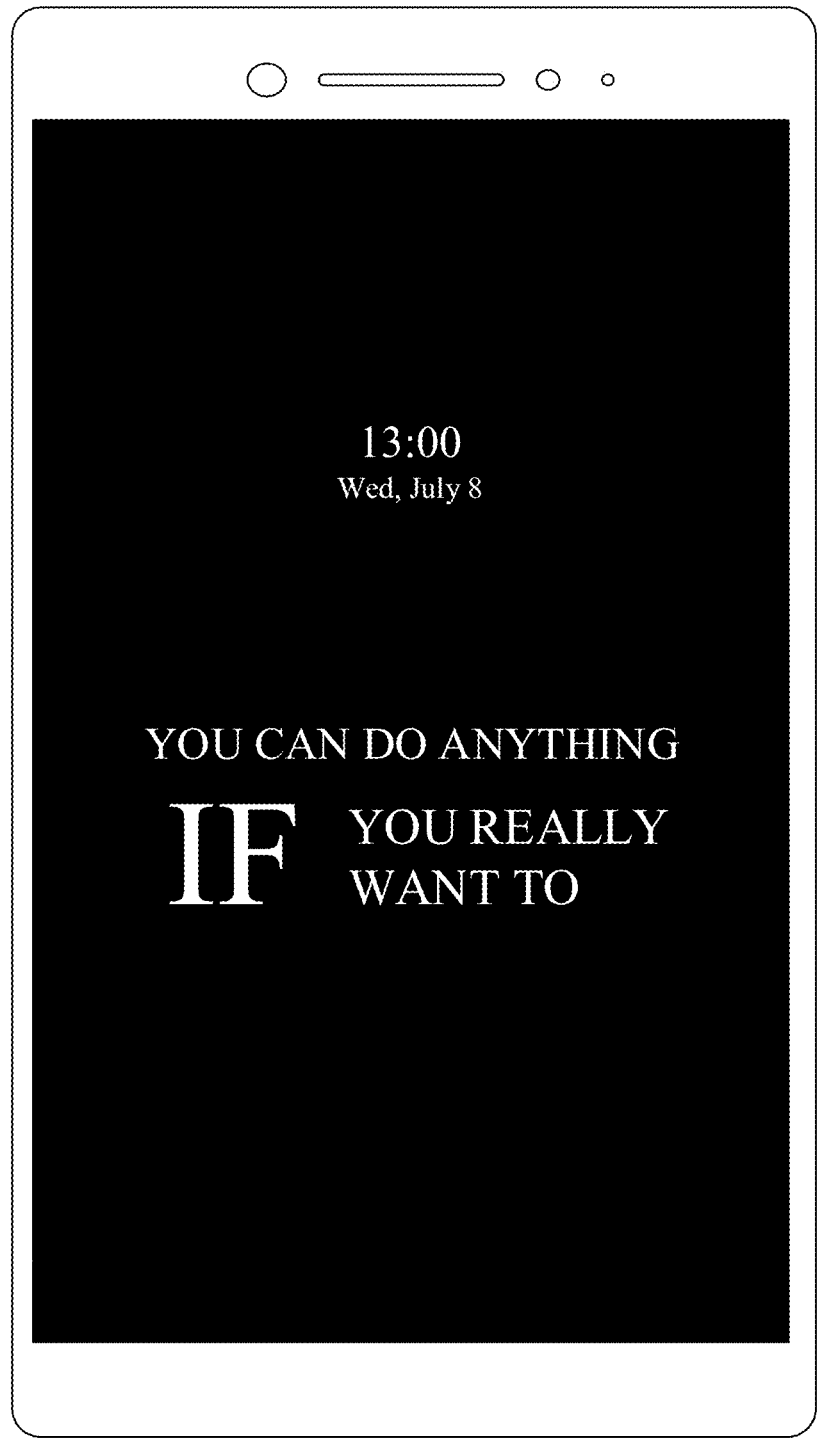

For example, refer to FIG. 4(i). The artistic signature is shown in a three-segment layout format. "YOU CAN DO ANYTHING" is on the upper side, "IF" is on the lower left side, and "YOU REALLY WANT TO" is on the lower right side.

Figure 4J:
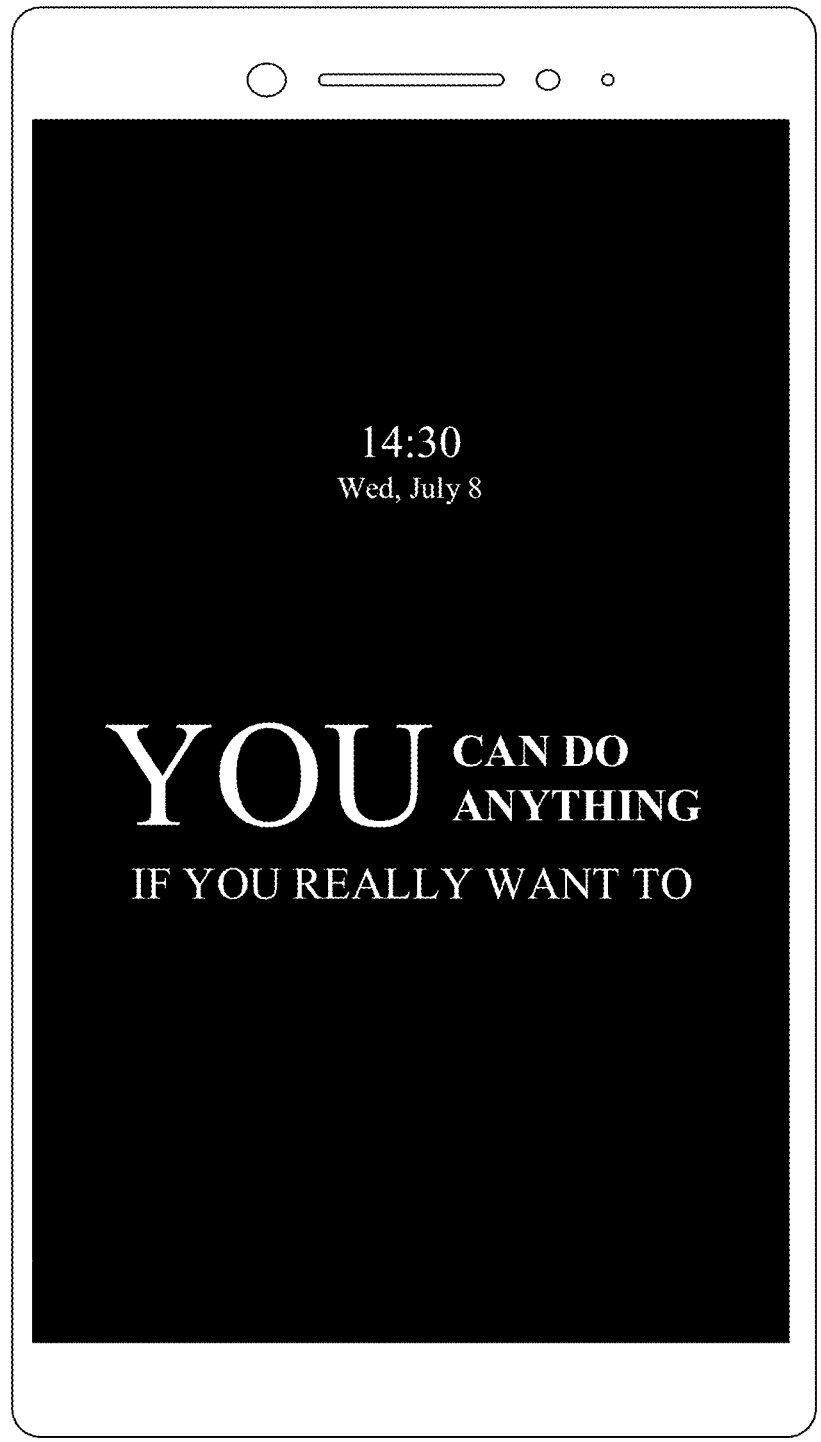

For example, refer to FIG. 4(j). The artistic signature is shown in a three-segment layout format. "YOU" is on the upper left side, "CAN DO ANYTHING" is on the upper right side, and "IF YOU REALLY WANT TO" is on the lower side.

Figure 5:
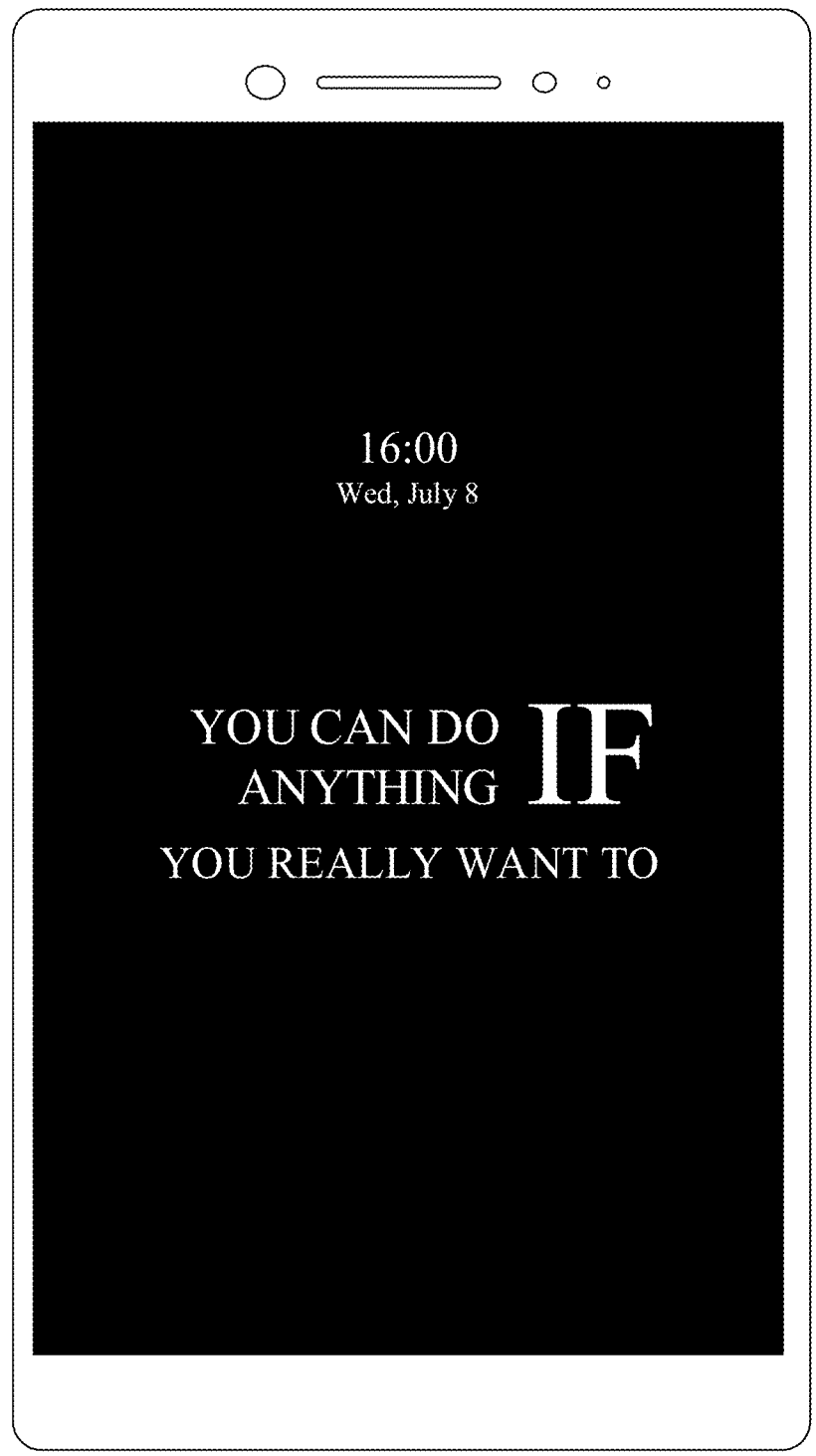
FIG. 5 shows another GUI according to an embodiment of this application.

For example, refer to a GUI shown in FIG. 5. The artistic signature is shown in a three-segment layout format. "YOU CAN DO ANYTHING" is on the upper left side, "IF" is on the upper right side, and "YOU REALLY WANT TO" is on the lower side.

In an embodiment, after the mobile phone detects, in the window 401 shown in FIG. 4(b), that the user taps a style, the mobile phone may always display the artistic signature style after entering the always on display interface each time. For example, each time the mobile phone enters the always on display interface, the mobile phone displays the style shown in FIG. 4(d).

In an embodiment, the mobile phone may provide a selection of a plurality of artistic signature styles. For example, in the window 401 shown in FIG. 4(b), the mobile phone may support the user in selecting a plurality of styles. When detecting that the user taps a plurality of artistic signature styles, the mobile phone may switch between the plurality of styles each time the mobile phone enters the always on display interface (for example, the phone may randomly switch between a plurality of styles).

It should be understood that, in this embodiment of this application, if a system language set by the user in the electronic device is Chinese, the user may set AOD in another language such as English or Russian. Alternatively, if a system language is English, the user can set AOD in another languages such as Chinese or Russian.

In an embodiment, when the system language is switched, the mobile phone may prompt the user whether to switch an AOD text accordingly.

FIG. 6(a) to FIG. 6(f) show still another group of GUIs according to an embodiment of this application.

Figure 6A:
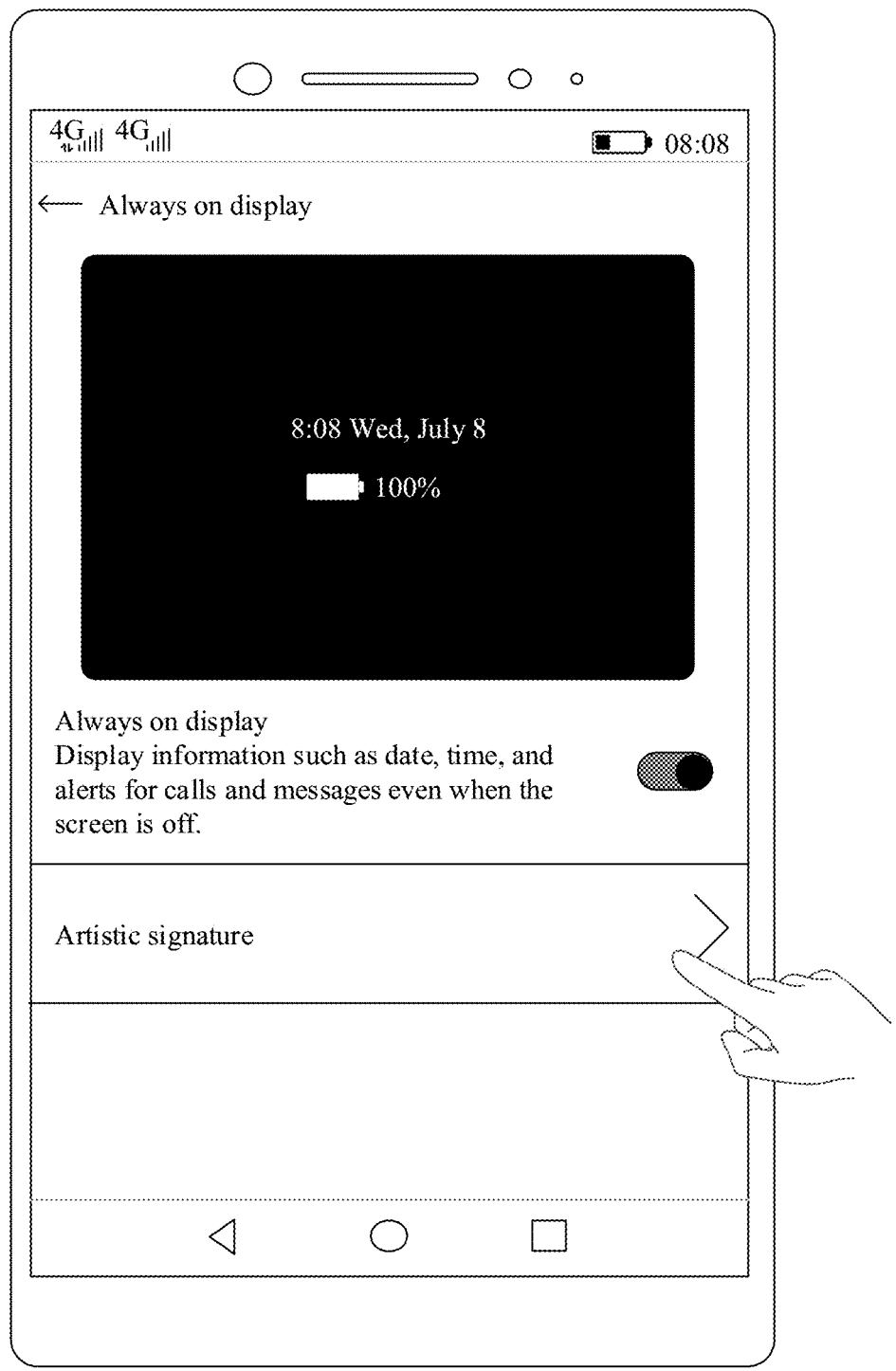
FIG. 6(a) to FIG. 6(f) show still another group of GUIs according to an embodiment of this application.

Refer to a GUI shown in FIG. 6(a). The GUI is an always on display setting interface. The setting interface includes an always on display preview interface, an always on display switch control, and a control corresponding to an artistic signature. After detecting an operation that the user taps the control corresponding to the artistic signature, the mobile phone may display a GUI shown in FIG. 6(b).

Different from the GUI shown in FIG. 4(a), the mobile phone may further automatically adjust a layout format of information such as time and a date. For example, time and a date in FIG. 4(a) are centered. However, in FIG. 6(a), time and a date are in a same line, and the mobile phone may further display information about a remaining battery level on an always on display interface.

Figure 6B:
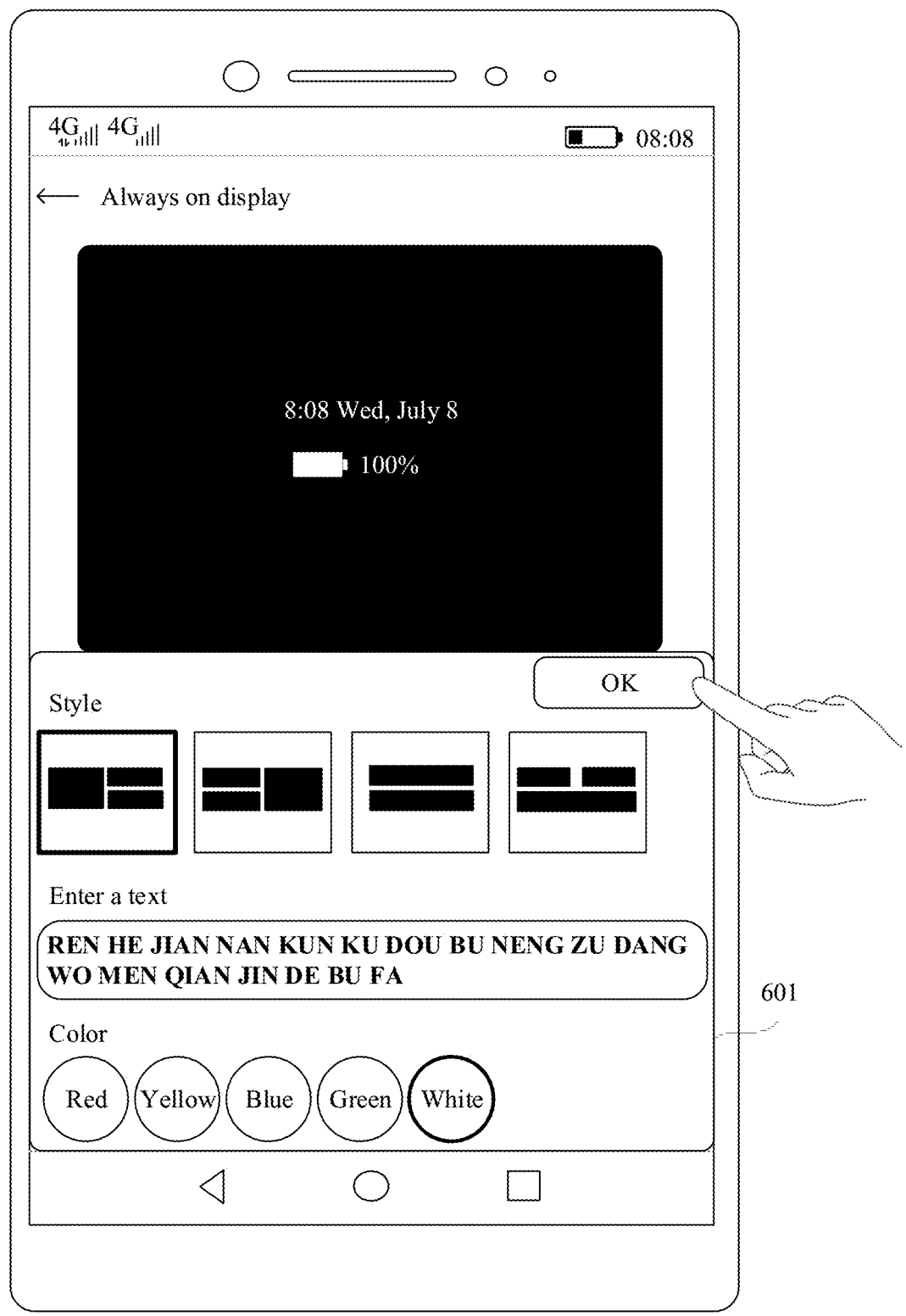

Refer to the GUI shown in FIG. 6(b). After detecting the operation that the user taps the control corresponding to the artistic signature, the mobile phone may pop up a window 601. The window 601 may include functions such as selecting a style of an artistic signature, entering a text, and selecting color of an artistic signature.

Figure 6C:
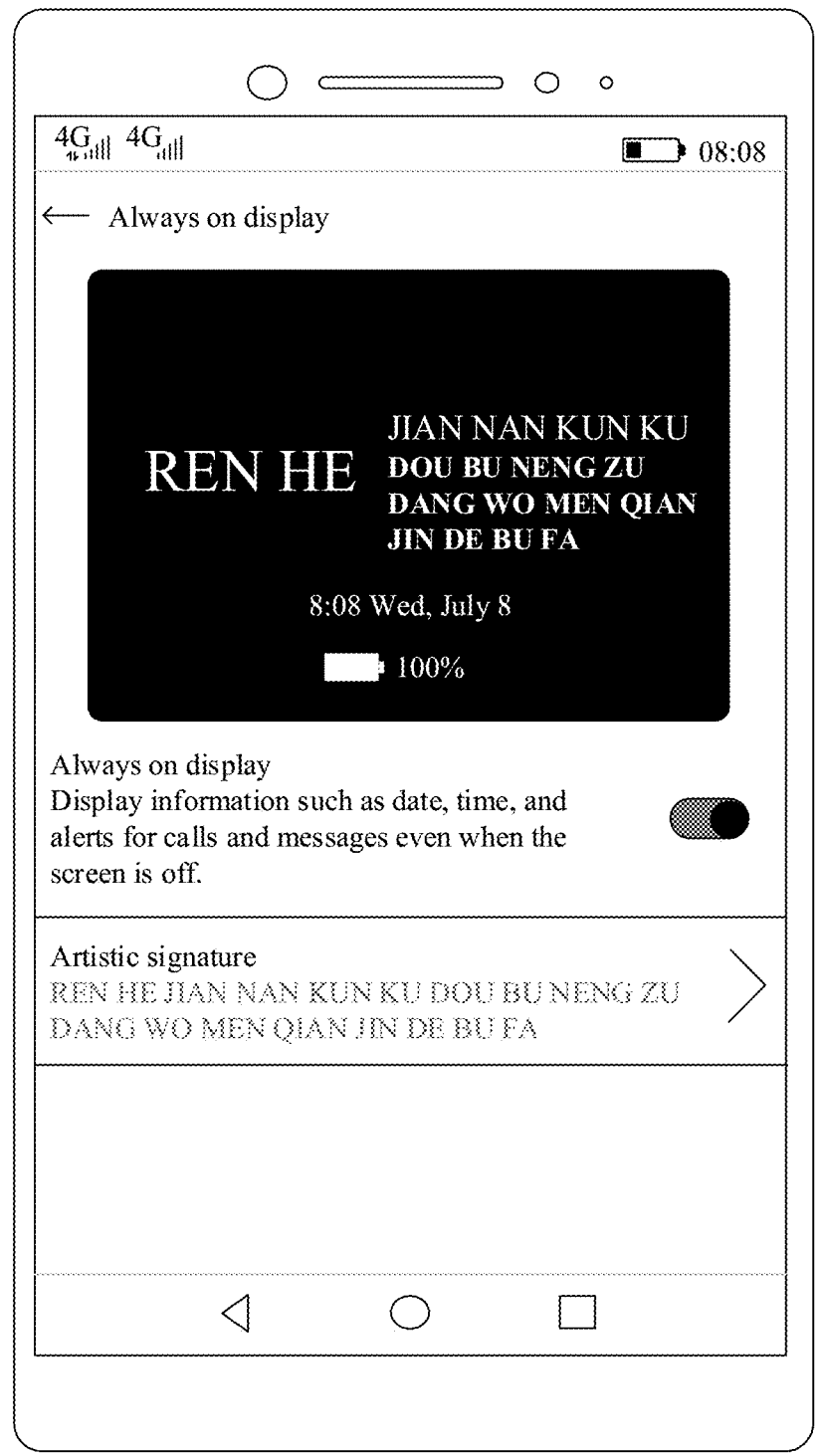

When the mobile phone detects operations that the user enters an artistic signature in a text input box in the window 601 (for example, "REN HE JIAN NAN KUN KU DOU BU NENG ZU DANG WO MEN QIAN JIN DE BU FA"), selects a style and color of the artistic signature, and taps an OK control, the mobile phone may display a GUI shown in FIG. 6(c).

Refer to the GUI shown in FIG. 6(c). The GUI is another always on display setting interface. The setting interface includes another always on display preview interface. The preview interface includes an always on display interface after the artistic signature is added. The artistic signature "REN HE BAN NAN KUN KU DOU BU NENG ZU DANG WO MEN QIAN JIN DE BU FA" is displayed above information such as time and a date, as shown in the figure. After the mobile phone enters an always on display state, the mobile phone may display a GUI shown in FIG. 6(d).

In this embodiment of this application, after obtaining an artistic signature entered by the user, the mobile phone may first perform word segmentation determining on the artistic signature. For example, the mobile phone may perform word segmentation determining on the text "REN HE JIAN NAN KUN KU DOU BU NENG ZU DANG WO MEN QIAN JIN DE BU FA" to segment the text into "REN HE", "JIAN NAN", "KUN KU", "DOU", "BU NENG", "ZU DANG", "WO MEN", "QIAN JIN", "DE", and "BU FA". After the mobile phone detects that the user selects a layout format, the mobile phone may lay out the word segments based on the layout format. For a specific distribution manner, refer to descriptions of the following internal implementation process. Details are not described herein again.

Figure 6D:
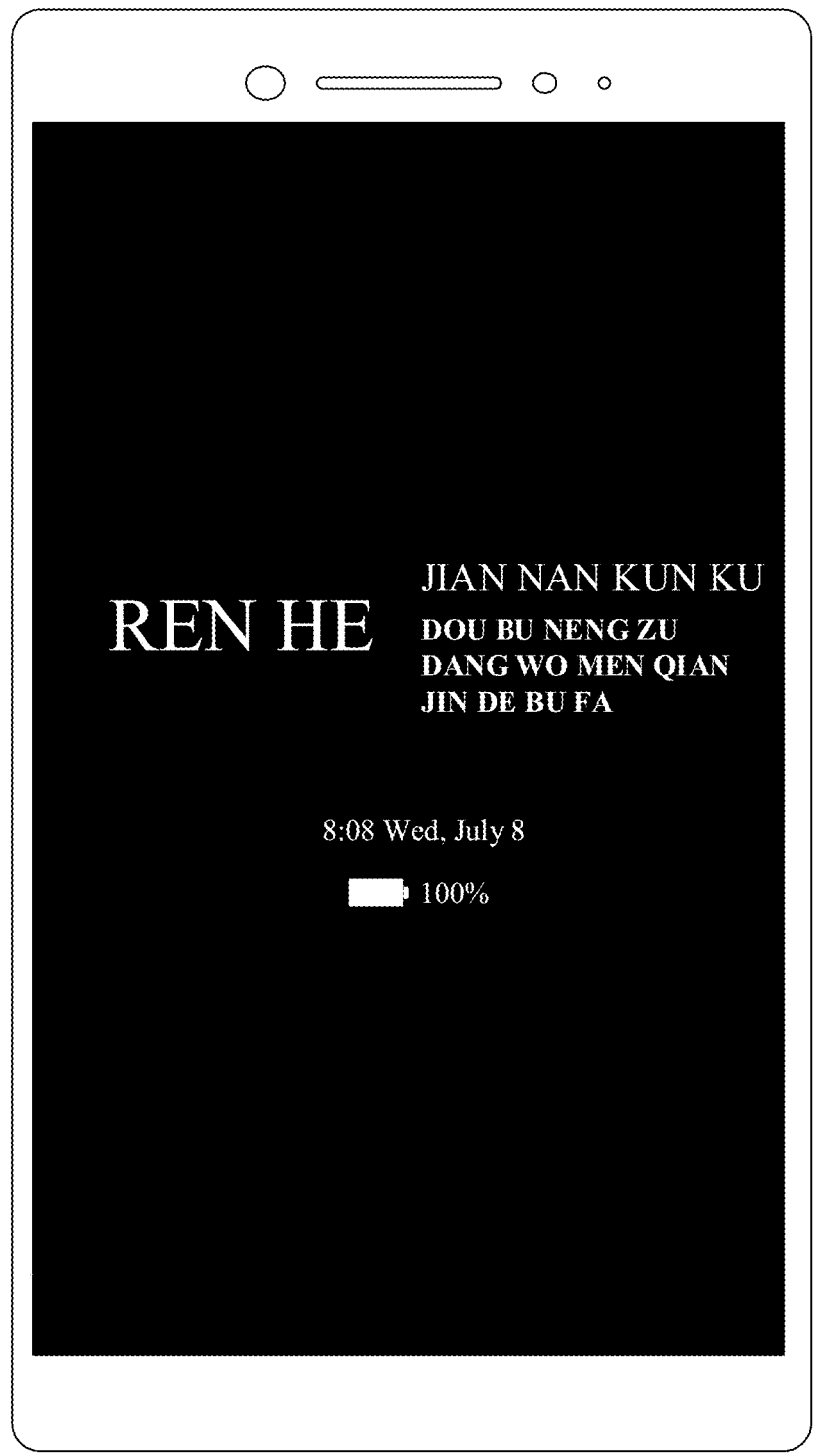

Refer to the GUI shown in FIG. 6(d). The GUI is an always on display interface of the mobile phone after the artistic signature is set. The always on display interface may display information such as a date, time, and an artistic signature. The artistic signature is shown in a three-segment layout format. "REN HE" is on the left side, "JIAN NAN KUN KU" is on the upper right side, and "DOU BU NENG ZU DANG WO MEN QIAN JIN DE BU FA" is on the lower right side. The overall artistic signature obtained after layout is located below information such as time and a date.

After that, each time the mobile phone enters the always on display interface, the mobile phone may change an artistic signature style (or layout format). For example, FIG. 6(e) to FIG. 6(f) indicate different layout formats that may be displayed on the mobile phone each time the mobile phone enters the always on display interface.

Figure 6E:
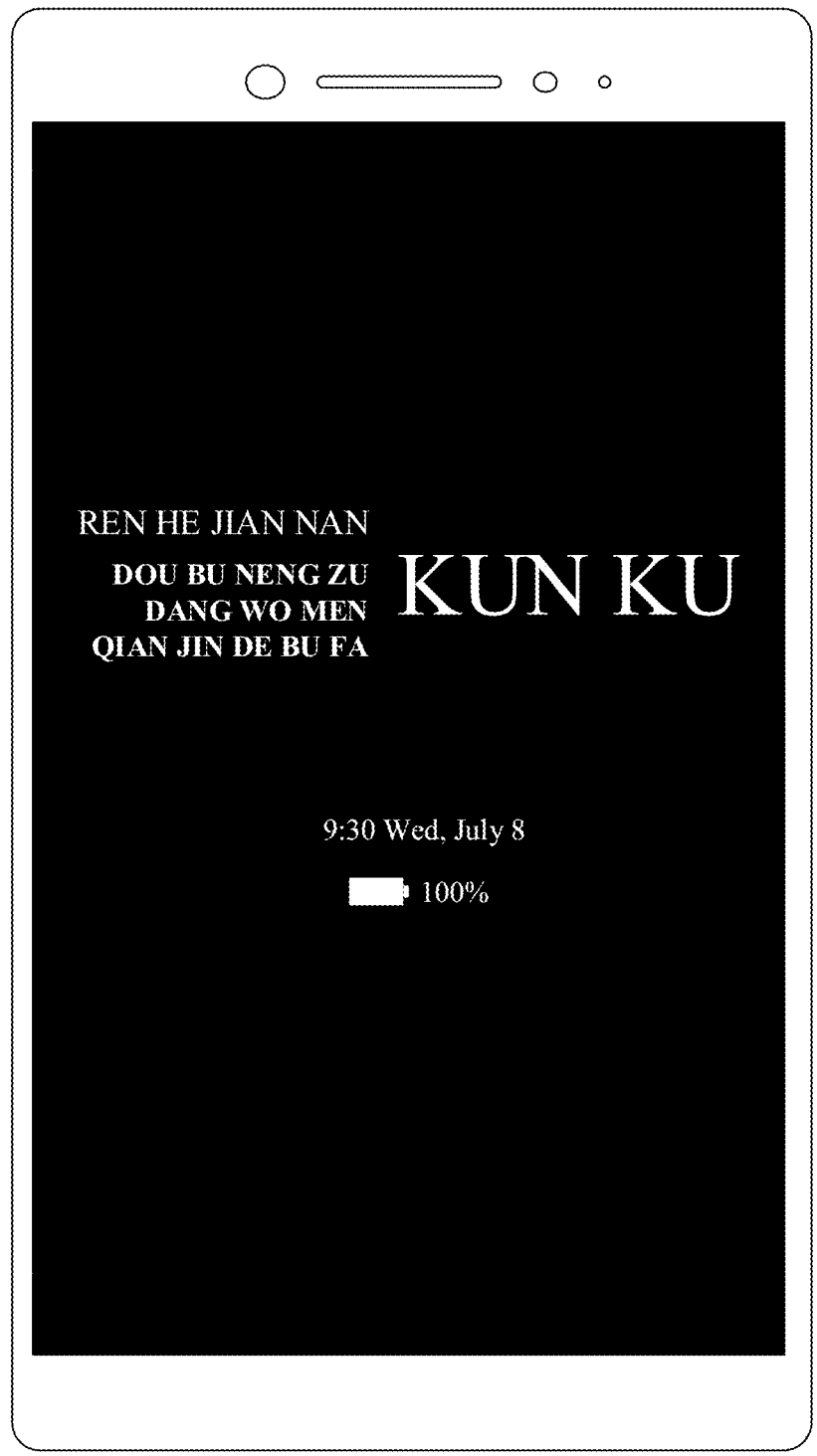

For example, as shown in FIG. 6(e), the artistic signature is shown in a three-segment layout format. "REN HE JIAN NAN" is on the upper left side, "DOU BU NENG ZU DANG WO MEN QIAN JIN DE BU FA" is on the lower left side, and "KUN KU" is on the right side.

Figure 6F:
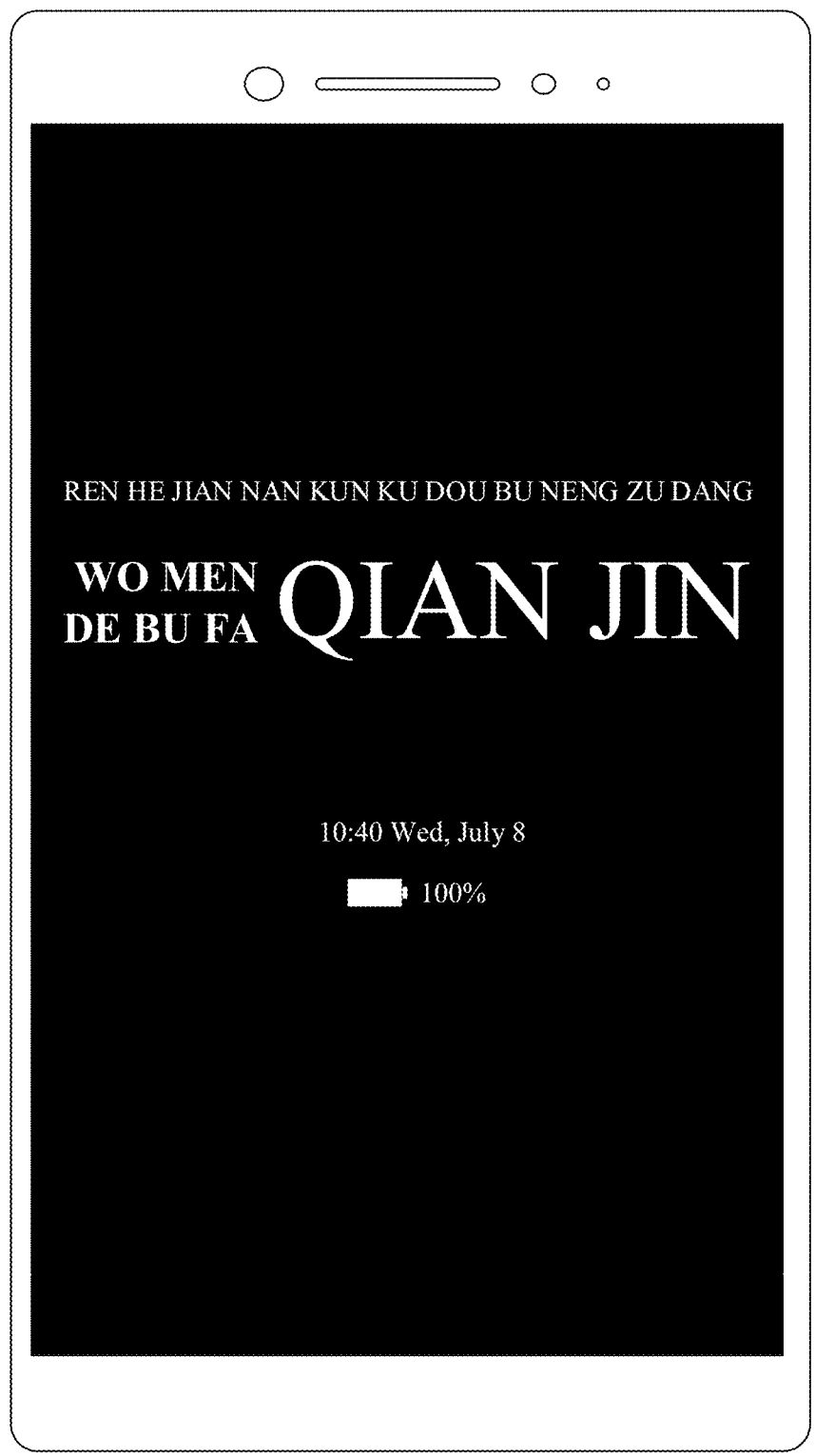

For example, as shown in FIG. 6(f), the artistic signature is shown in a three-segment layout format. "REN HE JIAN NAN KUN KU" is on the upper side, "WO MEN DE BU FA" is on the lower left side, and "QIAN JIN" is on the lower right side.

Figure 7A:
FIG. 7(a) to FIG. 7(c) show yet another group of GUIs according to an embodiment of this application.
Figure 7B:
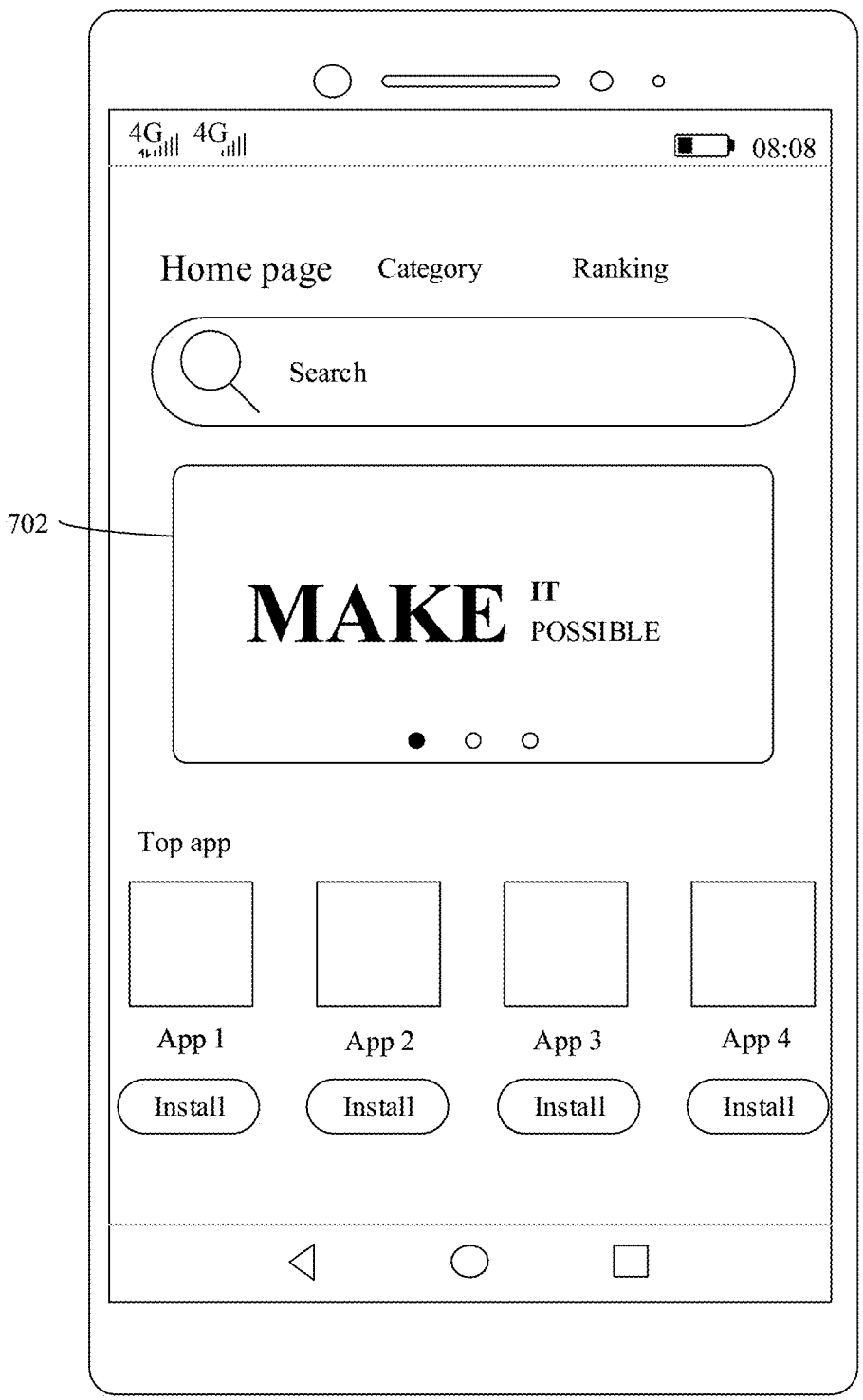
Figure 7C:
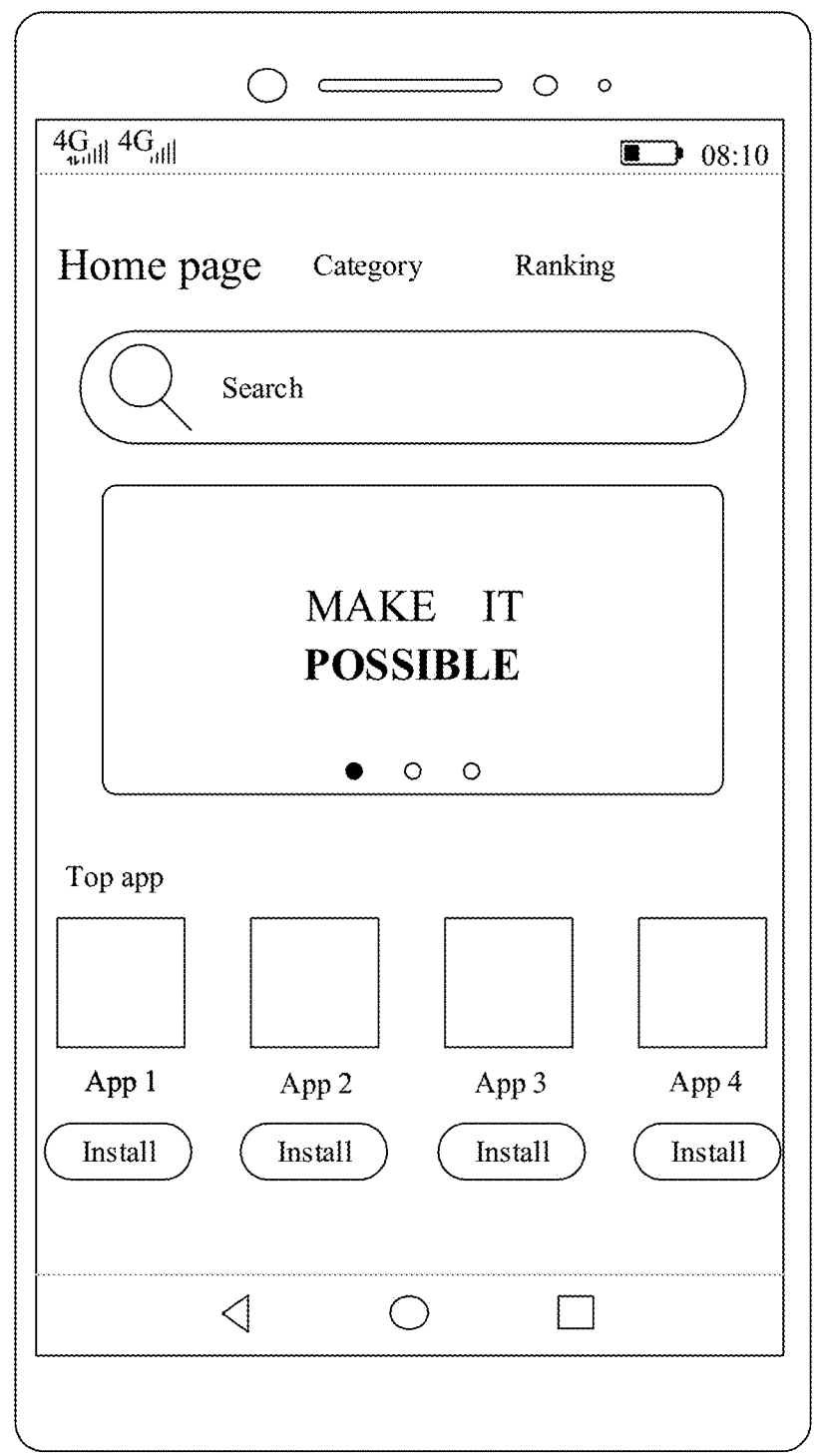

This embodiment of this application is applicable to an AOD scenario, and is also applicable to a scenario in which a dynamic title is presented. FIG. 7(a) to FIG. 7(c) show yet another group of GUIs according to an embodiment of this application.

Refer to a GUI shown in FIG. 7(a). The GUI is a home screen of a mobile phone. The GUI includes a plurality of application icons, and the plurality of application icons include an AppGallery icon 701. After detecting an operation that the user taps a Settings icon 701 on the home screen, the mobile phone may start to open an AppGallery, and display a GUI shown in FIG. 7(b).

As shown in FIG. 7(b), the GUI is a display interface of AppGallery. The display interface includes a card 702. The dynamic icon 702 may be used to present a dynamic title, and the dynamic title may be an introduction to an advertisement or an application. As shown in FIG. 7(b), the dynamic title is "MAKE IT POSSIBLE". The dynamic title may be shown in a three-segment layout format. "MAKE" is on the left side, "IT" is on the upper right side, and "POSSIBLE" is on the lower right side.

It should be understood that cards may be automatically switched on the display interface of AppGallery based on preset duration (for example, 5 seconds).

Refer to FIG. 7(c). The GUI is another display interface of AppGallery. As shown in FIG. 7(b), when the card displayed on the display interface is switched to the card 702 again, the dynamic title may be shown in a two-segment layout format. "MAKE IT" is on the upper side, and "POSSIBLE" is on the lower side.

It should be understood that, in this embodiment of this application, the mobile phone may obtain, from a server in real time, a layout format of the dynamic title displayed on the card 702, so that the mobile phone may display the dynamic title on the card based on the layout format provided by the server. Alternatively, a layout format of the dynamic title displayed on the card 702 may be obtained after layout of the mobile phone is performed.

It should be further understood that the GUIs shown in FIG. 7(a) to FIG. 7(c) are described by using AppGallery as an example. This embodiment of this application is not limited thereto. Some GUIs can be correspondingly displayed in some applications that need to display similar information, for example, on a page of WeChat Read.

FIG. 8(a) to FIG. 8(e) shows still yet another group of GUIs according to an embodiment of this application.

Figure 8A:
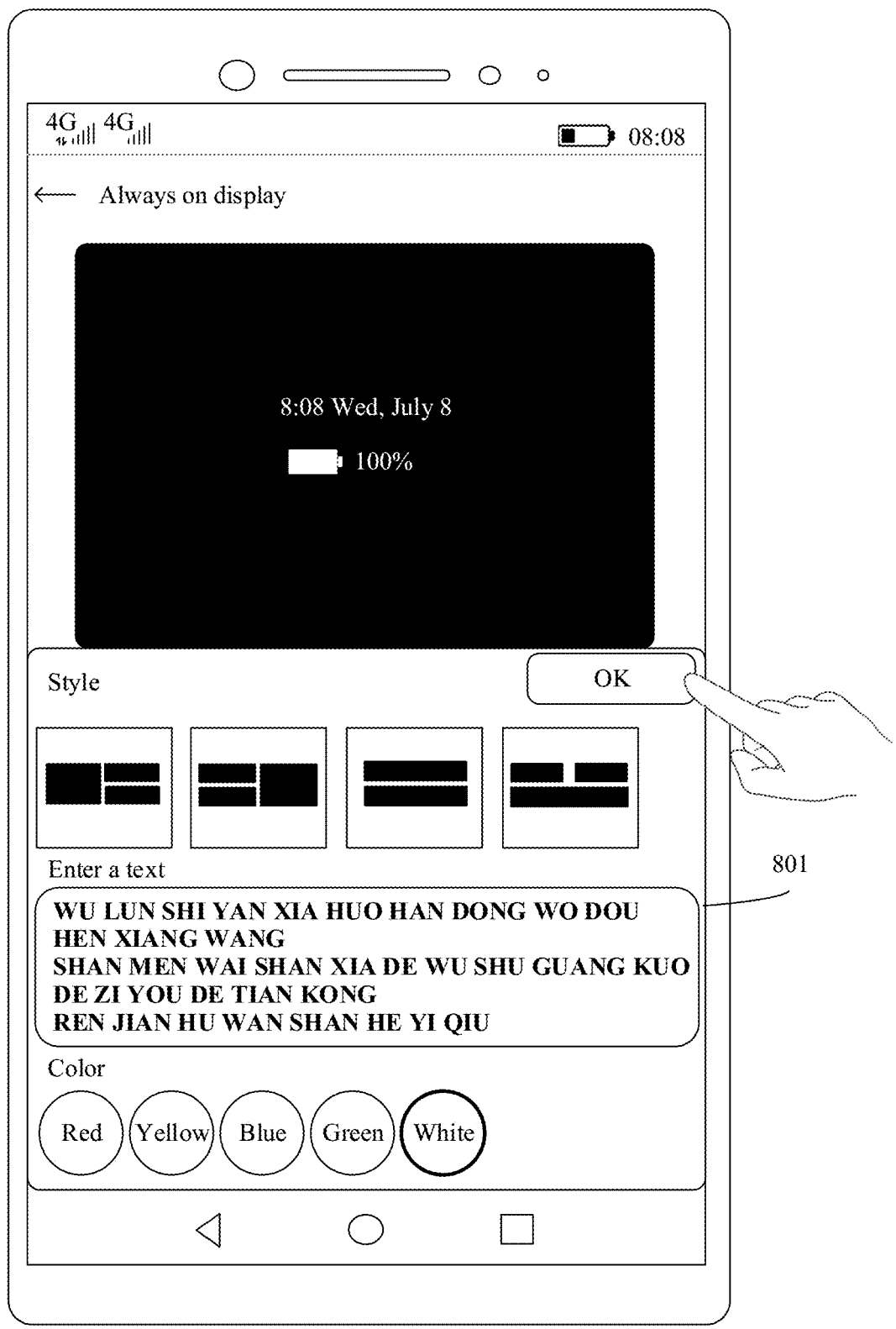
FIG. 8(a) to FIG. 8(e) show still yet another group of GUIs according to an embodiment of this application.

Refer to FIG. 8(a). After the mobile phone detects an operation performed by the user to tap a control corresponding to an artistic signature, the mobile phone may pop up a window 801. The window 801 may include functions such as selecting a style of an artistic signature, entering a text (for example, "WU LUN SHI YAN XIA HUO HAN DONG WO DOU HEN XIANG WANG SHAN MEN WAI SHAN XIA DE WU SHU GUANG KUO DE ZI YOU DE TIAN KONG SHAN BAN HU WAN SHAN HE YI QIU"), and selecting color of an artistic signature.

Figure 8B:

As shown in FIG. 8(b), a GUI is an always on display setting interface. The setting interface includes an always on display preview interface. The preview interface includes an always on display interface after the artistic signature is added. The artistic signature "WU LUN SHI YAN XIA HUO HAN DONG WO DOU HEN XIANG WANG SHAN MEN WAI SHAN XIA DE WU SHU GUANG KUO DE ZI YOU DE TIAN KONG SHAN JIAN HU WAN SHAN HE YI QIU" is displayed above information such as time and a date based on a layout shown in the figure. After the mobile phone enters an always on display state, the mobile phone may display a GUI shown in FIG. 8(c).

Figure 8C:
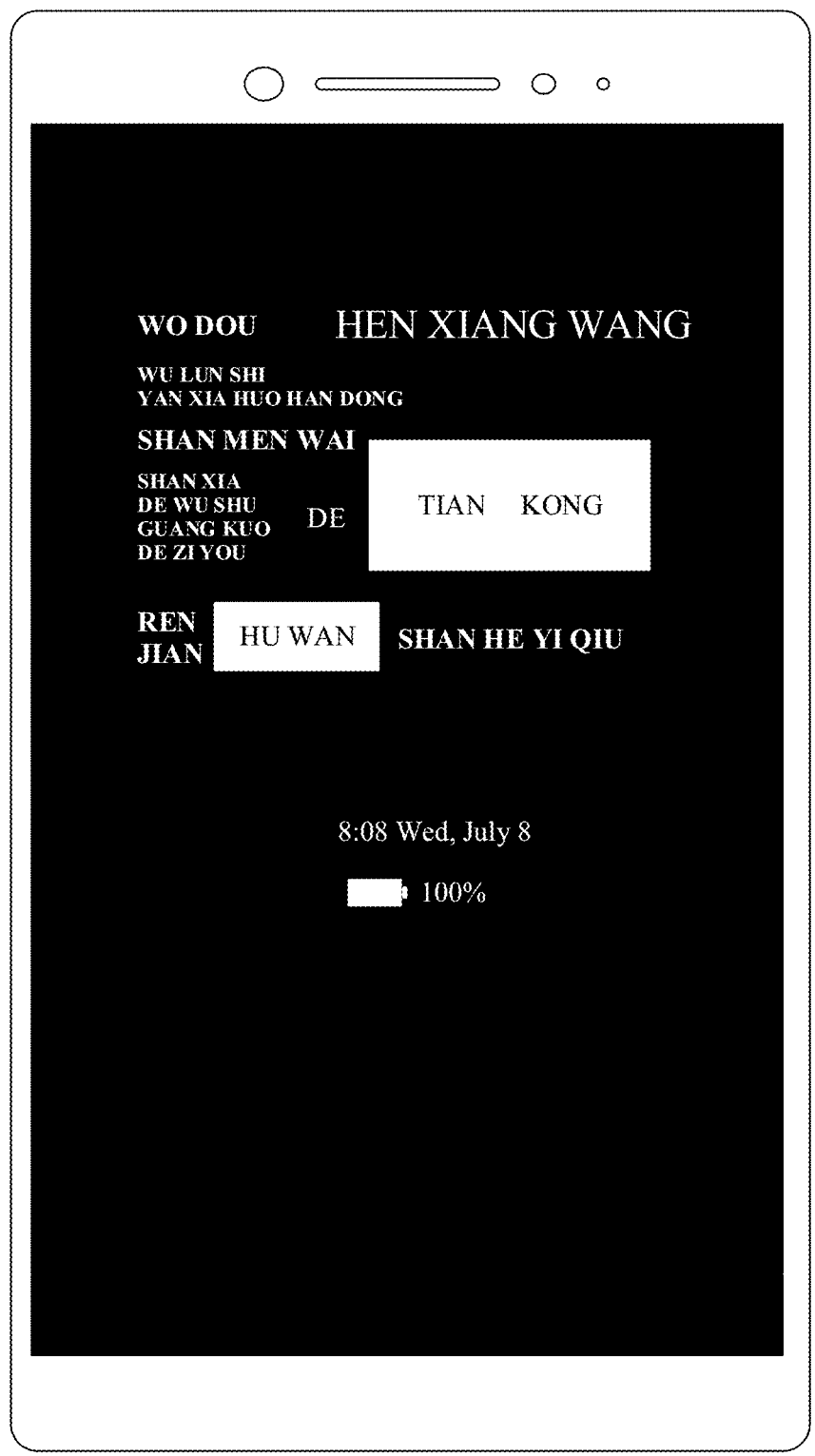
Figure 8D:
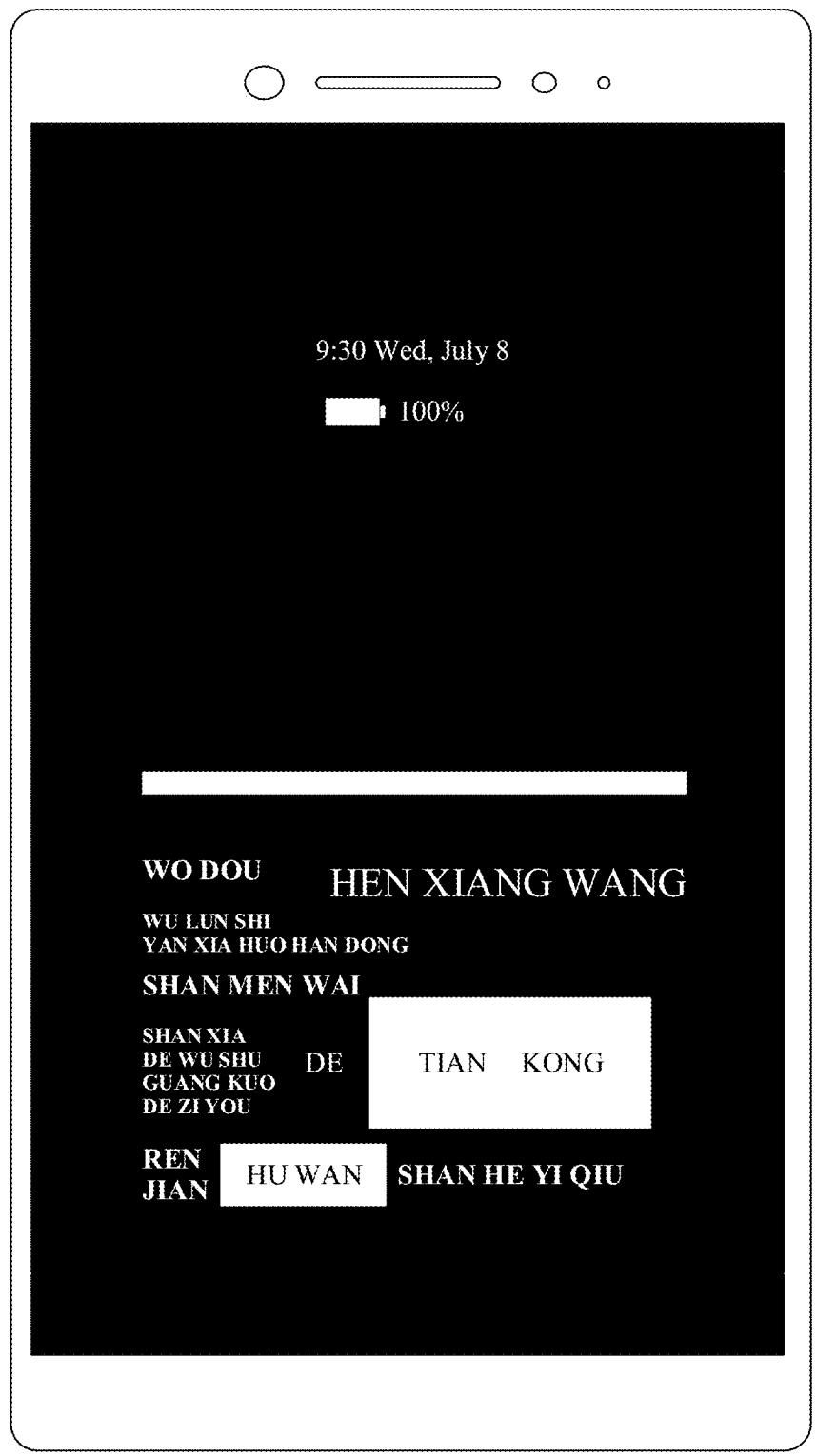
Figure 8E:
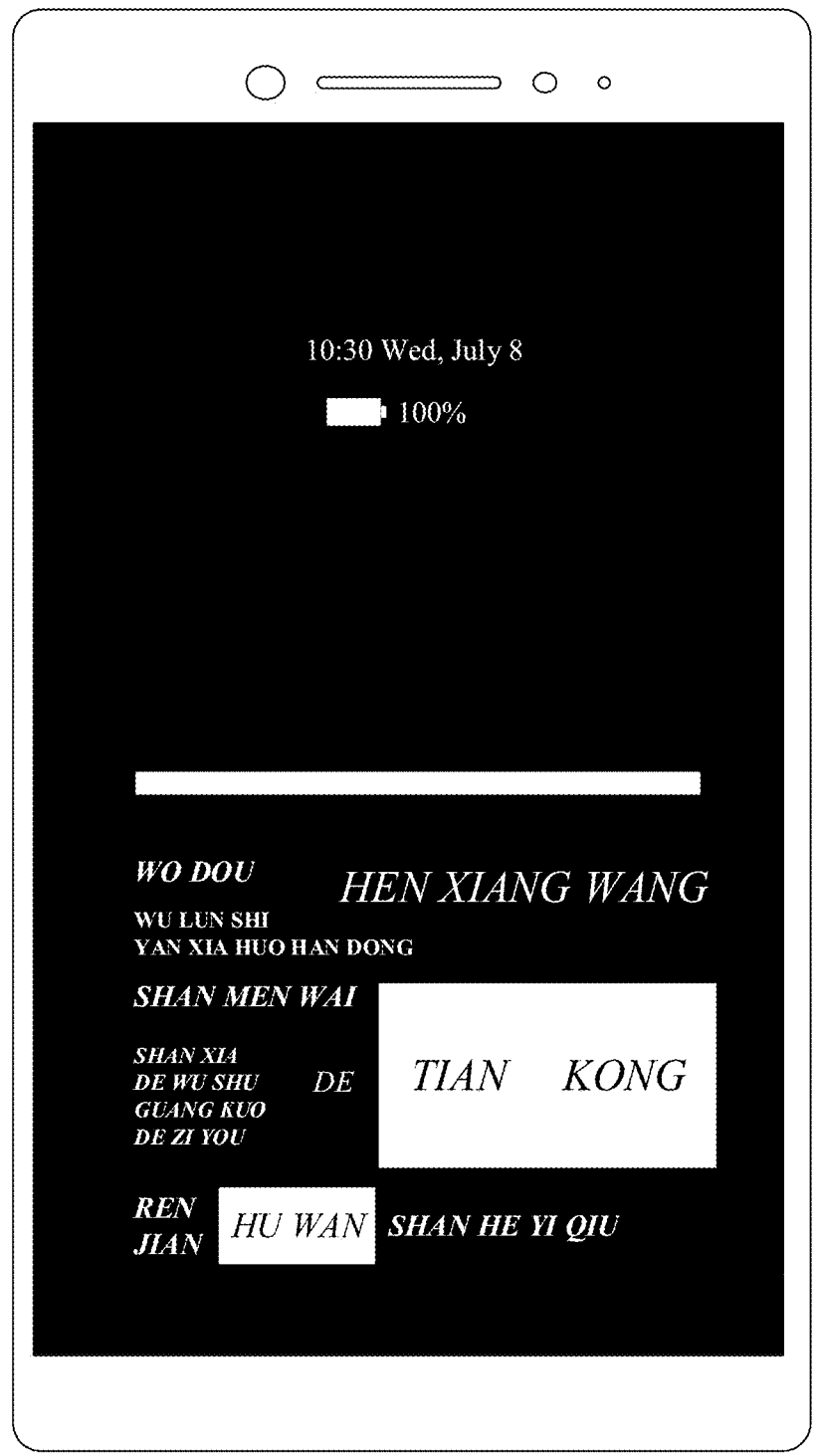

Refer to the GUI shown in FIG. 8(c). The GUI is an always on display interface of the mobile phone after the artistic signature is set. The always on display interface may display information such as a date, time, and an artistic signature.

The artistic signature is segmented into three segments: "WU LUN SHI YAN XIA HUO HAN DONG WO DOU HEN XIANG WANG", "SHAN MEN WAI SHAN XIA DE WU SHU GUANG KUO DE ZI YOU DE TIAN KONG", and "SHAN JIAN HU WAN SHAN HE YI QIU".

The first segment "WU LUN SHI YAN XIA HUO HAN DONG WO DOU HEN XIANG WANG" is shown in a three-segment layout format. "WO DOU" is on the upper left side, "WU LUN SHI YAN XIA HUO HAN DONG" is on the lower left side, "HEN XIANG WANG" is on the right side.

The second segment "SHAN MEN WAI SHAN XIA DE WU SHU GUANG KUO DE ZI YOU DE TIAN KONG" is shown in a three-segment layout format. "SHAN MEN WAI" is on the upper left side, "SHAN XIA DE WU SHU GUANG KUO DE ZI YOU DE" is on the lower left side, and "TIAN KONG" is on the right side.

Alternatively, it may be understood that "SHAN MEN WAI SHAN XIA DE WU SHU GUANG KUO DE ZI YOU DE TIAN KONG" is shown in a four-segment layout format. The locations of "SHAN MEN WAI" and "TIAN KONG" remain unchanged. Compared to the layout format above, "SHAN XIA DE WU SHU GUANG KUO DE ZI YOU DE" is segmented into two segments: "SHAN XIA DE WU SHU GUANG KUO DE ZI YOU DE" is on the left side, that is, on the right side of "DE".

The third segment "SHAN JIAN HU WAN SHAN HE YI QIU" is shown in a three-segment layout format. "SHAN JIAN" is on the left side, "HU WAN" is in the middle, and "SHAN HE YI QIU" is on the right side.

In one embodiment, font color of "TIAN KONG" and "HU WAN" is black and a white background is added, and font color of the remaining characters is white.

The overall artistic signature obtained after layout is located above information such as time and a date.

After that, each time the mobile phone enters the always on display interface, the mobile phone may change an artistic signature style (or layout format). For example, FIG. 8(d) to FIG. 8(f) indicate different layout formats that may be displayed on the mobile phone each time the mobile phone enters the always on display interface.

In an embodiment, when entering the always on display interface again, the mobile phone may change a location relationship between an artistic signature, time and a date. For example, from FIG. 8(c) to FIG. 8(d), the artistic signature may be changed from a location above time and a date to a location below time and a date.

In an embodiment, when entering the always on display interface again, the mobile phone may change a font direction of the artistic signature. For example, from FIG. 8(d) to FIG. 8(e), the artistic signature may change to be in italics.

In an embodiment, when the mobile phone enters the always on display interface again, a font format (for example, "Song typeface" or "regular script"), font color, and a font size of the artistic signature may be changed.

In this embodiment of this application, the electronic device may dynamically and automatically lay out a text with reference to a word segmentation technology and a layout rule, to implement a rich visual effect of a same text without user customization. This helps improve user experience.

The foregoing describes several groups of GUIs provided in embodiments of this application. The following describes an internal implementation process of embodiments of this application.

Figure 9:
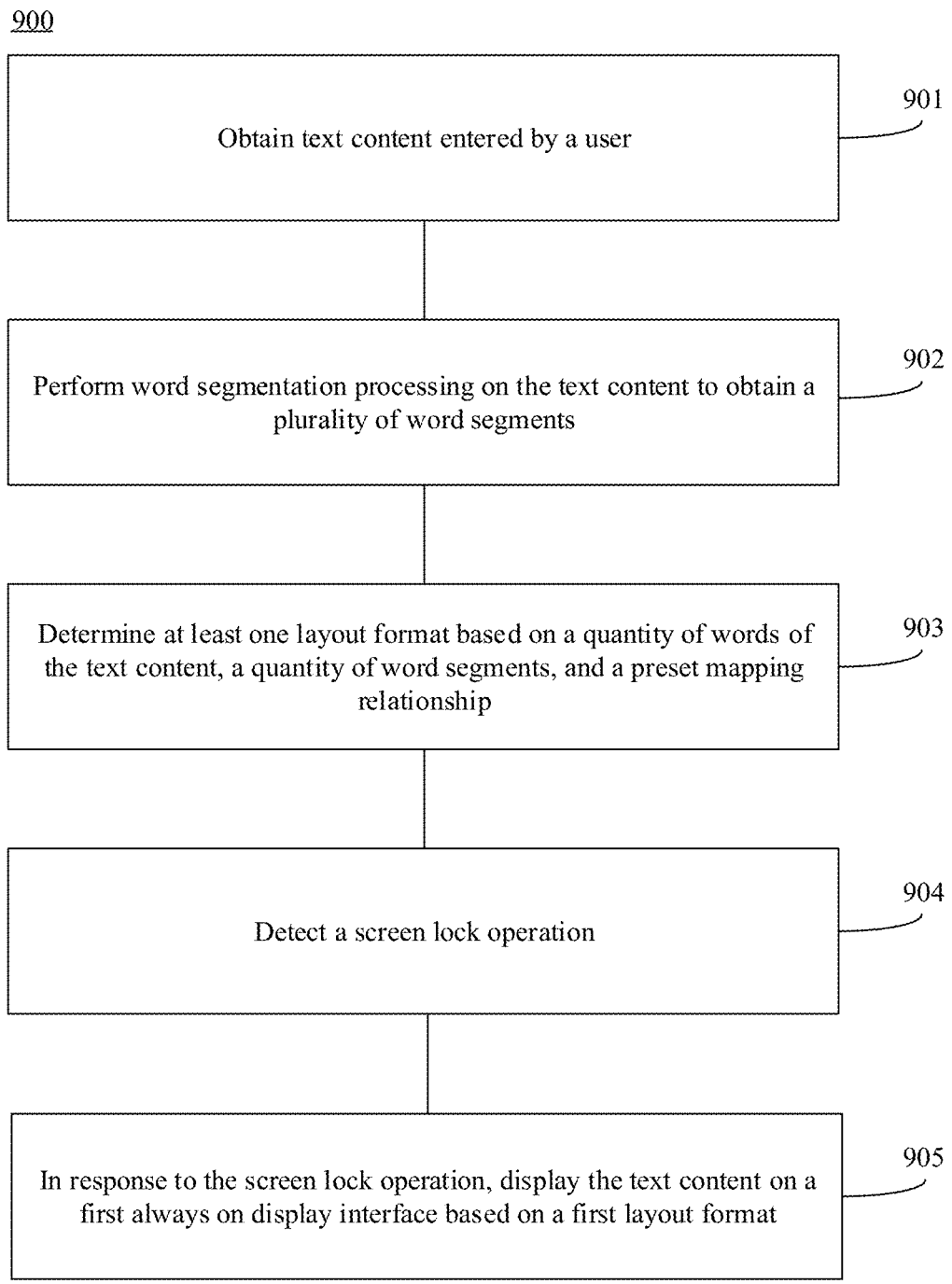
FIG. 9 is a schematic flowchart of an always on display method according to an embodiment of this application.

FIG. 9 is a schematic flowchart of an always on display method 900 according to an embodiment of this application. As shown in FIG. 9, the method 900 may be performed by an electronic device, and the method 900 includes the following steps.

S901: The electronic device obtains text content entered by a user.

For example, as shown in FIG. 3(e), the electronic device obtains text content "MAKE IT POSSIBLE" entered by the user.

For example, as shown in FIG. 4(b), the electronic device obtains text content "YOU CAN DO ANYTHING IF YOU REALLY WANT TO" entered by the user.

For example, as shown in FIG. 6(b), the electronic device obtains text content "REN HE JIAN NAN KUN KU DOU BU NENG ZU DANG WO MEN QIAN JIN DE BU FA" entered by the user.

In an embodiment, a manner in which the electronic device obtains the text content entered by the user is also entered by the user or may be preset in a system.

S902: The electronic device performs word segmentation processing on the text content to obtain a plurality of word segments.

For example, the electronic device performs word segmentation processing on the text content "MAKE IT POSSIBLE" and obtains three word segments: "MAKE", "IT", and "POSSIBLE".

For example, the electronic device performs word segmentation processing on the text content "REN HE JIAN NAN KUN KU DOU BU NENG ZU DANG WO MEN QIAN JIN DE BU FA" and obtains 10 word segments: "REN HE," "JIAN NAN," "KUN KU," "DOU", "BU NENG", "ZU DANG", "WO MEN", "QIAN JIN", "DE", and "BU FA".

A word segmentation technology is a basic module in natural language processing (natural language processing, NLP). For Latin languages such as English, words can be easily and accurately extracted because there are spaces between words as word boundaries. Chinese or Japanese characters are closely connected to each other unless there is a punctuation mark, and there is no obvious word boundary. Therefore, it is difficult to extract word segments. Currently, word segmentation processing may be performed on text content in some manners. For example, a text segment of a string of text is matched with an existing dictionary in a dictionary-based manner, that is, a string matching manner. If a text segment is found, the text segment can be used as a word segment. For another example, word segmentation processing may be performed by using a forward maximum matching method, an inverse maximum matching method, or a bidirectional maximum matching method.

It should be understood that, in this embodiment of this application, for a manner of performing word segmentation processing on text content, refer to a word segmentation manner in the conventional technology. For brevity, details are not described herein again. For example, Chinese may be segmented based on phrases, and each word in English can be considered as a word segment.

S903: The electronic device determines at least one layout format of the text content based on a quantity of words of the text content, a quantity of word segments, and a preset mapping relationship. The at least one layout format includes a first layout format.

In an embodiment, the electronic device may store a mapping relationship between a quantity of words of text content, a quantity of word segments, and a layout format.

For example, Table 1 shows a mapping relationship between a quantity of words of text content, a quantity of word segments, and a layout format.

TABLE 1

| Quantity of words | Word segment combination | Layout format |
| --- | --- | --- |
| 2 | 1 + 1 | Two-segment |
| 3 | 1/+2, 1/+1/+1 | Two-segment, three-segment |
| 4 | 2/+2, 1/+3, 1/+2/+1, 1/+1/+2 | Two-segment, three-segment |
| 5 | 2/+3, 2/+1/2 | Two-segment, three-segment |
| 6 | 2/+4, 3/+3, 2/2/2, 2/+2/2 | Two-segment, three-segment |
| 7 | 2/+5, 3/+4, 2/+2/+3, 3/+2/+2 | Two-segment, three-segment |
| 8 | 4/+4, 2/+6, 3/+5, 1/+3/+4, 2/+3/+3 | Two-segment, three-segment |
| 9 | 4/+5, 3/+6, 2/+7, 2/+3/4, 3/+3/3, 4/+3/+4 | Two-segment, three-segment |
| 10 | 4/+6, 3/+7, 2/+8, 1/+4/+5, 2/+4/+4, 3/+3/+4, 4/+3/+3 | Two-segment, three-segment |
| 11 | 5/+6, 4/+7, 3/+8, 2/+4/+5, 3/+4/+4, 4/+3/+4 | Two-segment, three-segment |
| 12 to 30 | . . . | Three-segment |
| 30+ | . . . | Normal alignment (left/right/center) |

It should be understood that, in the word segmentation combination column in Table 1, a number "2" indicates that two words are combined into one word segment; "3" indicates that three words are combined into one word segment; "+2" indicates that each of two words in text content is used as a separate word segment; "+3" indicates that each of three words is used as a separate word segment, or indicates a combination in which one word is used as a word segment and two words are used as a word segment in a text; and "+4" indicates a combination in which two words are used as a word segment and two words are used as a word segment in a text.

It should be further understood that word segment combinations and layout formats shown in Table 1 are merely examples, and there may be other word segment combination manners and layout formats. This is not limited in this embodiment of this application.

It should be further understood that, in this embodiment of this application, the electronic device may determine a layout format by querying a table based on a mapping relationship, or by directly performing calculation based on a quantity of words and a quantity of word segments. The electronic device may obtain a plurality of layout formats by querying a table or based on a quantity of words and a quantity of word segments, and randomly display a layout format each time entering an always on display interface subsequently. Alternatively, the electronic device may determine a layout format in real time each time entering an always on display interface, and then display the layout format according to a result determined in real time.

For example, the electronic device performs word segmentation processing on text content "FEN DOU BA QING CHUN" and obtains three word segments: "FEN DOU", "BA", and "QING CHUN". In this case, a three-segment layout format may be used in a manner of "2/+1/2".

For example, the electronic device performs word segmentation processing on text content "YUE NU LI YUE XING YUN" and obtains four word segments: "YUE", "NU LI", "YUE", and "XING YUN" In this case, a three-segment layout format may be used in a manner of "2/+2/2".

For example, the electronic device performs word segmentation processing on text content "CUN JIN NAN MAI CUN GUANG YIN" and obtains six word segments: "CUN", "JIN", "NAN", "MAI", "CUN", and "GUANG YIN". In this case, a two-segment layout format may be used in a manner of "2/+5". Alternatively, a three-segment layout format may be used in a manner of "2/+2/+3". For example, "GUANG YIN" is on the left side, "CUN" and "JIN" are on the upper right side, and "NAN", "MAI", and "CUN" are on the lower right side.

For example, the electronic device performs word segmentation processing on text content "ZHI WO MEN ZHONG JIANG SHI QU DE QING CHUN" and obtains "ZHI", "WO MEN", "ZHONG JIANG", "SHI QU", "DE", and "QING CHUN". In this case, a three-segment layout format may be used in a manner of "1/+4/+5". "ZHI" is on the right side, "WO MEN" and "ZHONG JIANG" are on the upper left side, and "SHI QU", "DE", and "QING CHUN" are on the lower left side.

For example, there are three words and three word segments in the text content "MAKE IT POSSIBLE". In this case, a second-segment layout format may be used.

In this embodiment of this application, the two-segment layout format includes but is not limited to the following several cases:

(1) □ left side; □ right side; and
(2) □ upper side; □ lower side.

For example, for "MAKE IT POSSIBLE", "MAKE IT" may be on the left side and "POSSIBLE" may be on the right side.

For example, "MAKE IT" may be on the upper side and "POSSIBLE" may be on the lower side.

For example, there are 18 words and 10 word segments in the text content "REN HE JIAN NAN KUN KU DOU BU NENG ZU DANG WO MEN QIAN JIN DE BU FA". In this case, a three-segment layout format may be used.

In this embodiment of this application, the three-segment layout format includes but is not limited to the following several cases:

(1) □ right side; □ upper left side; □ lower left side;
(2) □ left side; □ upper right side; □ lower right side;
(3) □ upper side; □ lower left side; □ lower right side; and
(4) □ lower side; □ upper left side; □ upper right side.

For example, as shown in FIG. 6(d), the text content "REN HE JIAN NAN KUN KU DOU BU NENG ZU DANG WO MEN QIAN JIN DE BU FA" may follow the layout format in (2). The word segment "REN HE" may be on the left side. The word segments "JIAN NAN" and "KUN KU" are on the upper right side. The word segments "DOU", "BU NENG", "ZU DANG", "WO MEN", "QIAN JIN", "DE", and "BU FA" are on the lower right side.

For example, as shown in FIG. 6(e), based on the layout format in (1), the word segment "KUN KU" may be on the right side. The word segments "REN HE" and "JIAN NAN" are on the upper left side. The word segments "DOU", "BU NENG", "ZU DANG", "WO MEN", "QIAN JIN", "DE", and "BU FA" are on the lower left side.

For example, as shown in FIG. 6(f), based on the layout format in (3), the word segments "REN HE", "JIAN NAN", "KUN KU", "DOU", "BU NENG", and "ZU DANG" may be on the upper side. The word segments "WO MEN", "DE", and "BU FA" are on the lower left side. The word segment "QIAN JIN" is on the lower right side.

It should be understood that, in this embodiment of this application, after the electronic device determines to use a three-segment layout format and determines a specific segmentation manner (for example, any one of (1), (2), (3), or (4)), the electronic device may randomly put these word segments.

As shown in FIG. 6(d), "BU FA" may be on the left side. "REN HE", "JIAN NAN", and "KUN KU" are on the upper right side. "DOU", "BU NENG" "ZU DANG", "WO MEN", "QIAN JIN", and "DE" are on the lower right side.

S904: The electronic device detects a screen lock operation.

For example, the screen lock operation may be an operation of pressing a power button by the user that is detected by the electronic device when a non-lock-screen interface is displayed.

For example, the screen lock operation may alternatively be an operation of using a "one-touch lock screen" button function by the user that is detected by the electronic device.

For example, the screen lock operation may alternatively be an operation that the electronic device is automatically screen-locked when the electronic device displays a non-lock-screen interface and does not detect a user operation within preset duration.

S905: In response to the screen lock operation, the electronic device displays the text content on a first always on display interface based on the first layout format.

In an embodiment, the electronic device enters a non-always on display interface from the first always on display interface, and enters a second always on display interface from the non-always on display interface. The electronic device displays the text content on the second always on display interface based on a second layout format. The at least one layout format includes the second layout format, and the second layout format is different from the first layout format.

For example, FIG. 3(g) may be the first always on display interface, and FIG. 3(h) may be the second always on display interface. After a mobile phone enters a non-always on display interface from the always on display interface shown in FIG. 3(g), and enters the always on display interface shown in FIG. 3(h) from the non-always on display interface, a layout format of the text content "MAKE IT POSSIBLE" may be changed on the mobile phone.

In an embodiment, when the electronic device determines a plurality of layout formats in S903, the electronic device may randomly select one layout format from the plurality of layout formats, to display the text content based on the layout format when performing AOD. Then, the electronic device may randomly select one layout format from the plurality of layout formats for display each time the electronic device performs AOD.

It should be understood that the foregoing method 900 is described by using an AOD scenario as an example. This embodiment of this application is not limited thereto. For example, the user may write a signature on the home screen, and the electronic device displays the signature as a lock screen wallpaper or a home screen wallpaper through layout, or may set the signature as a part of the home screen of the electronic device.

It should be further understood that the AOD scenario embodiment in the specification is also applicable to a lock screen wallpaper scenario or a home screen wallpaper scenario. For example, each time the electronic device is screen-on, layouts of text content on a lock screen wallpaper or a home screen wallpaper are different.

In an embodiment, the electronic device may further determine a height and a width of each part (or each area) in the layout format. Each part in the layout format may be a rectangle, a circle, an ellipse, a triangle, or the like. This embodiment of this application is not limited thereto. The following uses an example in which each part in the layout format is a rectangle for description.

Figure 10:
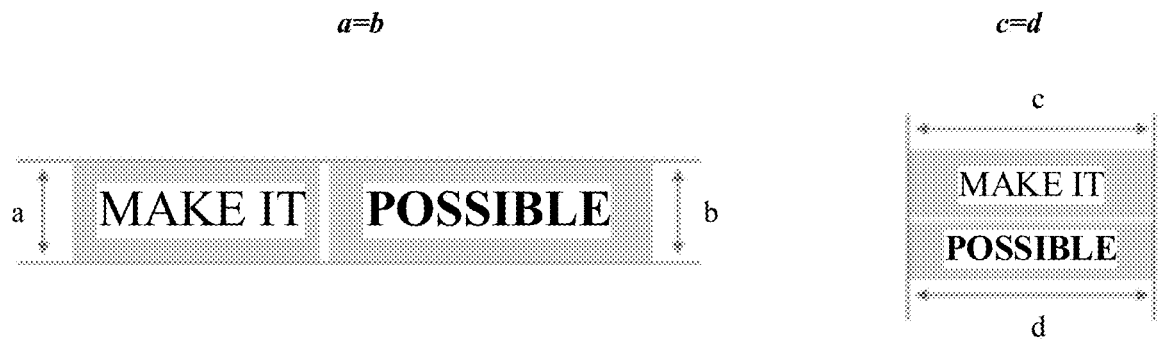
FIG. 10 is a schematic diagram of a layout format of text content according to an embodiment of this application.
Figure 10:
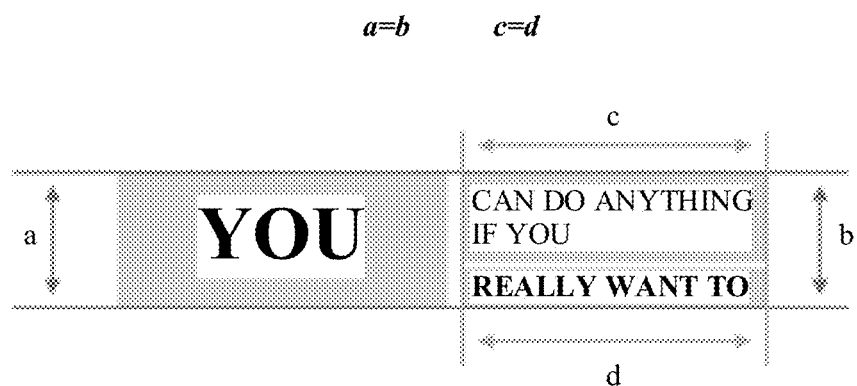
Figure 10:
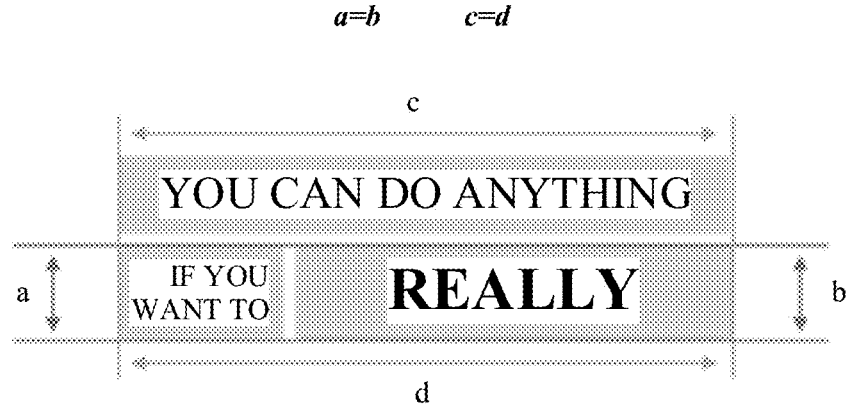

For example, as shown in (a) in FIG. 10, for a two-segment layout format, the electronic device may separately place "MAKE IT" in a left rectangular box, and place "POSSIBLE" in a right rectangular box. A height of the left rectangular box is a, and a height of the right rectangular box is b, where a is equal to b.

For example, as shown in (a) in FIG. 10, for a two-segment layout format, the electronic device may separately place "MAKE IT" in an upper rectangular box, and place "POSSIBLE" in a lower rectangular box. A width of the upper rectangular box is c, and a width of the lower rectangular box is d, where c is equal to d.

For example, as shown in (b) in FIG. 10, for a three-segment layout format, the electronic device may place "YOU" in a left rectangular box, place "CAN DO ANYTHING IF YOU" in an upper-right rectangular box, and "REALLY WANT TO" in a lower-right rectangular box. A height a of the left rectangular box is equal to a sum b of a height of the upper-right rectangular box and a height of the lower-right rectangular box. A width c of the upper-right rectangular box is equal to a width d of the lower-right rectangular box.

For example, as shown in (c) in FIG. 10, for a three-segment layout format, the electronic device may place "YOU CAN DO ANYTHING" in an upper rectangular box, place "IF YOU WANT TO" in a lower-left rectangular box, and place "REALLY" in a lower-right rectangular box. A height a of the lower-left rectangular box is equal to a height b of the lower-right rectangular box. A width c of the upper rectangular box is equal to a sum d of a width of the lower-left rectangular box and a width of the lower-right rectangular box.

It should be understood that the foregoing description is provided by using an example in which each part in the layout format is a rectangular box. In this embodiment of this application, each part in the layout format may alternatively be an image of another shape, for example, an ellipse. A two-segment layout format is used as an example. When two ellipses are distributed from top to bottom, major axes of the two ellipses are equal in length. When two ellipses are distributed from left to right, minor axes of the two ellipses are equal in length.

In an embodiment, a ratio of a layout width of text content finally generated by the electronic device to a screen width is a preset value.

Figure 11:
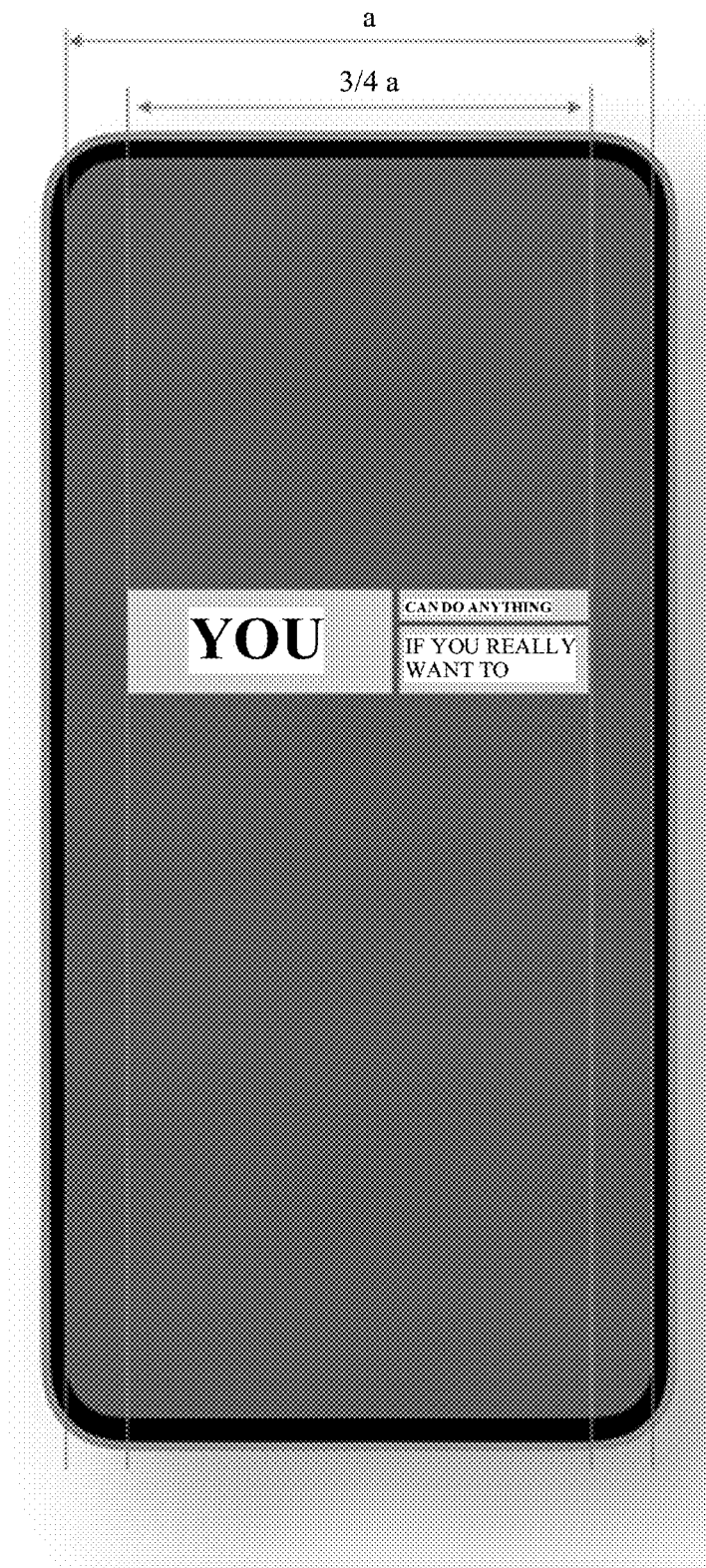
FIG. 11 is a schematic diagram of a ratio of a layout width of text content to a screen width according to an embodiment of this application.

For example, as shown in FIG. 11, a ratio of a layout width of text content finally generated by the electronic device to a screen width is 3:4.

When performing AOD, the electronic device may obtain a size or resolution of a screen width of the electronic device, so that a width occupied by each rectangular box may be determined based on a preset value.

In an embodiment, a ratio of a layout height of text content finally generated by the electronic device to a screen height is a preset value.

In an embodiment, the electronic device determines a weight value of a font in each part (or area) based on a quantity of words in each part (or area).

For example, a part with fewer words has a larger font weight value (or a larger font size), and a part with more words has a smaller font weight value (or a smaller font size).

Figure 12A:
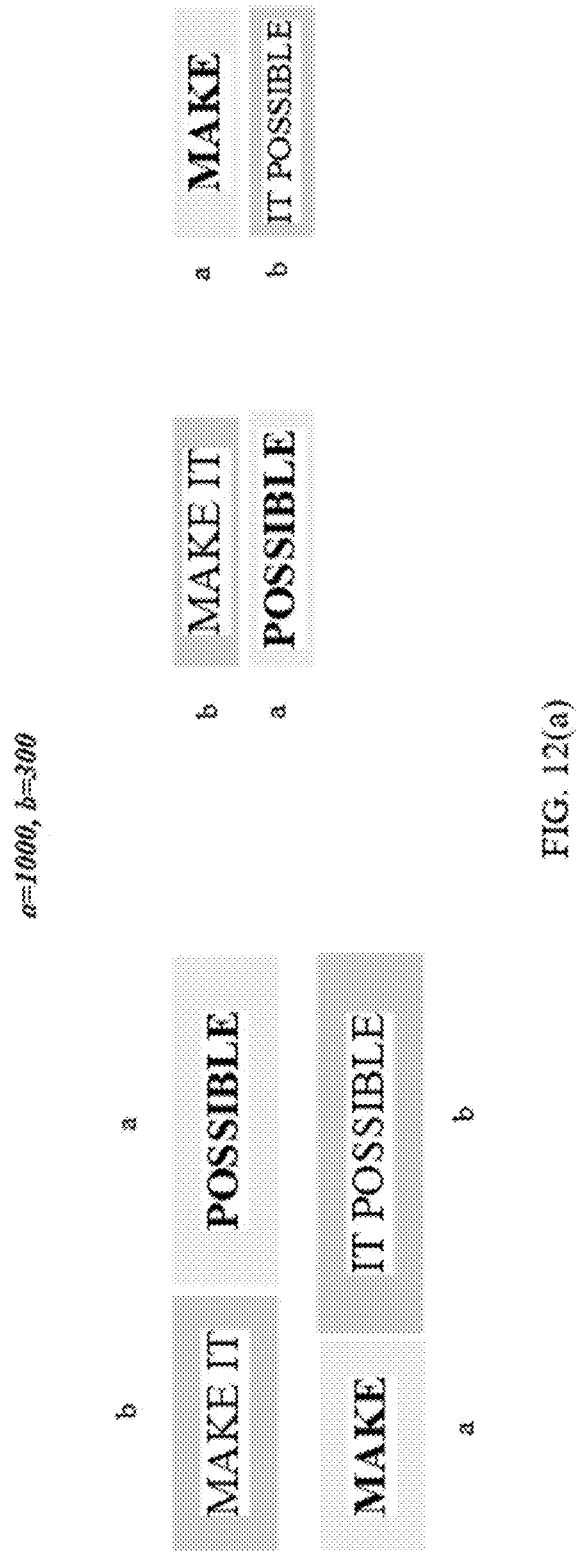
FIG. 12(a) and FIG. 12(b) are a schematic diagram of a layout format of text content according to an embodiment of this application.

For example, in the two-segment layout format shown in FIG. 12(a), when "MAKE IT" is on the left side and "POSSIBLE" is on the right side, a font weight value of "MAKE IT" is 300, and a font weight value of "POSSIBLE" is 1000.

It should be understood that, in this embodiment of this application, a font weight value may be represented by a number (300, 600, or 1000). A larger number indicates a thicker text.

For example, when "MAKE" is on the left side and "IT POSSIBLE" is on the right side, a font weight value of "MAKE" is 1000, and a font weight value of "IT POSSIBLE" is 300.

For example, when "MAKE IT" is on the upper side and "POSSIBLE" is on the lower side, a font weight value of "MAKE IT" is 300, and a font weight value of "POSSIBLE" is 1000.

For example, when "MAKE" is on the upper side and "IT POSSIBLE" is on the lower side, a font weight value of "MAKE" is 1000, and a font weight value of "IT POSSIBLE" is 300.

Figure 12B:
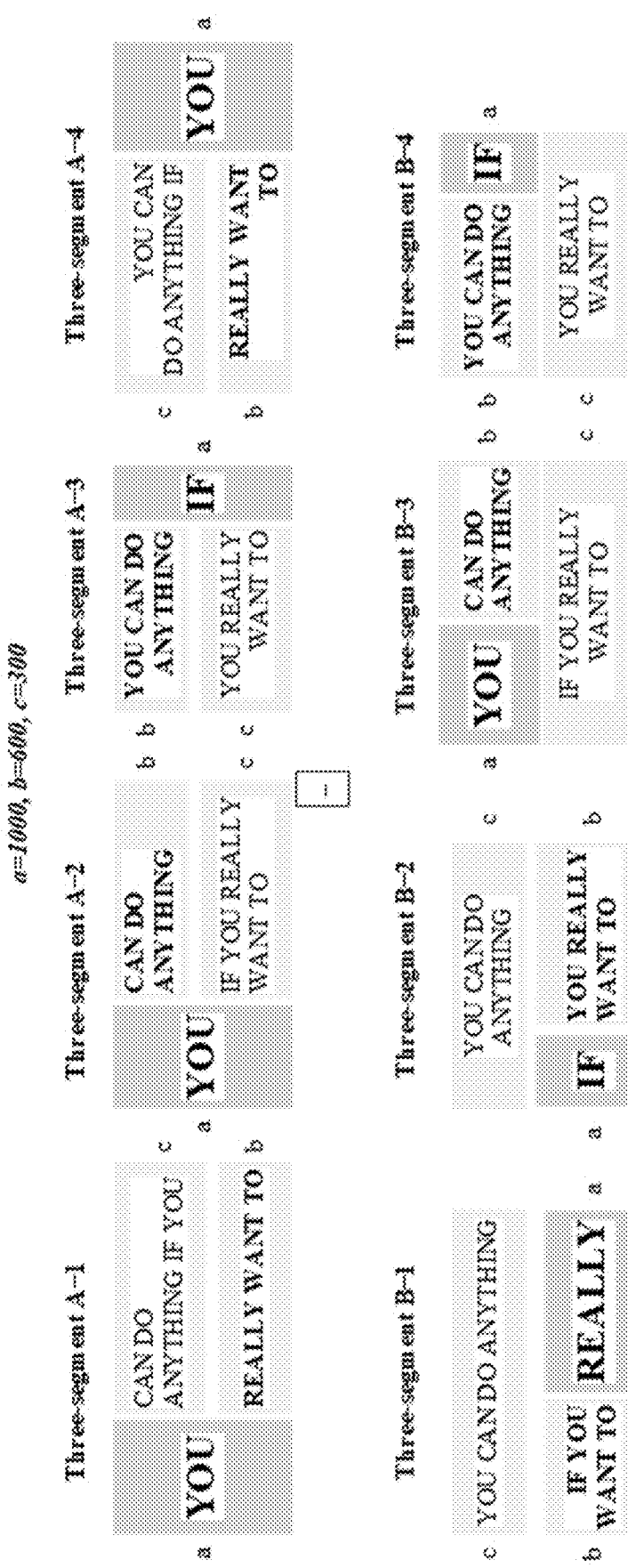

For example, in the three-segment layout format shown in FIG. 12(b), when "YOU" is on the left side, "CAN DO ANYTHING IF YOU" is on the upper right side, and "REALLY WANT TO" is on the lower right side, a font weight value of "YOU" is 1000, a font weight value of "CAN DO ANYTHING IF YOU" is 300, and a font weight value of "REALLY WANT TO" is 600.

For example, when "YOU" is on the left side, "CAN DO ANYTHING" is on the upper right side, and "IF YOU REALLY WANT TO" is on the lower right side, a font weight value of "YOU" is 1000, a font weight value of "CAN DO ANYTHING" is 600, and a font weight value of "IF YOU REALLY WANT TO" is 300.

For example, when "IF" is on the right side, "YOU CAN DO ANYTHING" is on the upper left side, and "YOU REALLY WANT TO" is on the lower left side, a font weight value of "IF" is 1000, a font weight value of "YOU CAN DO ANYTHING" is 600, and a font weight value of "YOU REALLY WANT TO" is 300.

For example, when "YOU" is on the right side, "YOU CAN DO ANYTHING IF" is on the upper left side, and "REALLY WANT TO" is on the lower left side, a font weight value of "YOU" is 1000, a font weight value of "YOU CAN DO ANYTHING IF" is 300, and a font weight value of "REALLY WANT TO" is 600.

For example, when "YOU CAN DO ANYTHING" is on the upper side, "IF YOU WANT TO" is on the lower left side, and "REALLY" is on the lower right side, a font weight value of "YOU CAN DO ANYTHING" is 300, a font weight value of "IF YOU WANT TO" is 600, and a font weight value of "REALLY" is 1000.

For example, when "YOU CAN DO ANYTHING" is on the upper side, "IF" is on the lower left side, and "YOU REALLY WANT TO" is on the lower right side, a font weight value of "YOU CAN DO ANYTHING" is 300, a font weight value of "YOU REALLY WANT TO" is 600, and a font weight value of "IF" is 1000.

For example, when "YOU" is on the upper left side, "CAN DO ANYTHING" is on the upper right side, and "IF YOU REALLY WANT TO" is on the lower side, a font weight value of "YOU" is 1000, a font weight value of "CAN DO ANYTHING" is 600, and a font weight value of "IF YOU REALLY WANT TO" is 1000.

For example, when "YOU CAN DO ANYTHING" is on the upper left side, "IF" is on the upper right side, and "YOU REALLY WANT TO" is on the lower side, a font weight value of "YOU CAN DO ANYTHING" is 600, a font weight value of "IF" is 1000, and a font weight value of "YOU REALLY WANT TO" is 300.

In this embodiment of this application, the electronic device may dynamically and automatically lay out a text with reference to a word segmentation technology and a layout rule, to implement a rich visual effect of a same text without user customization. This helps improve user experience.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An always on display method, wherein the method is applied to an electronic device, and the method comprises:
   obtaining text content;
   performing word segmentation processing on the text content to obtain a plurality of word segments;
   determining at least one layout format of the text content based on a quantity of words of the text content, a quantity of the plurality of word segments, and a preset mapping relationship, wherein the preset mapping relationship is a mapping relationship between a quantity of words, a quantity of word segments, and a layout format, and the at least one layout format comprises a first layout format;
   detecting a screen lock operation;
   in response to the screen lock operation, displaying the text content on a first always on display interface based on the first layout format; and
   when entering anon-always on display interface from the first always on display interface, and entering a second always on display interface from the non-always on display interface, displaying the text content on the second always on display interface based on a second layout format, wherein
   the second layout format belongs to the at least one layout format, and the second layout format is different from the first layout format.

2. The method according to claim 1, wherein the first layout format comprises a first part and a second part, and the plurality of word segments are located in the first part and the second part, wherein
   when the first part and the second part are distributed from top to bottom, widths of the first part and the second part are equal; or
   when the first part and the second part are distributed from left to right, heights of the first part and the second part are equal.

3. The method according to claim 2, wherein
   a quantity of words comprised in the first part is greater than a quantity of words comprised in the second part, and a font weight value in the first part is less than a font weight value in the second part.

4. The method according to claim 1, wherein the first layout format comprises a first part, a second part, and a third part, and the plurality of word segments are located in the first part, the second part, and the third part, wherein
   when the first part and the second part are distributed from top to bottom, and the first part and the second part are both located on the left or right side of the third part, widths of the first part and the second part are equal, and a sum of heights of the first part and the second part is equal to a height of the third part; or when the first part and the second part are distributed from left to right, and the first part and the second part are both located above or below the third part, heights of the first part and the second part are equal, and a sum of widths of the first part and the second part is equal to a width of the third part.

5. The method according to claim 4, wherein a quantity of words comprised in the third part is greater than a quantity of words comprised in the first part, and a font weight value in the third part is less than a font weight value in the first part.

6. The method according to claim 1, wherein a ratio of a screen width occupied by the text content laid out based on the first layout format to a screen width of the electronic device is a preset value.

7. An electronic device, comprising:
a display;
one or more processors; and
one or more memories, wherein
the one or more memories store instructions, and when the instructions are executed by the one or more processors, cause the one or more processors to perform the following steps:
obtaining text content;
performing word segmentation processing on the text content to obtain a plurality of word segments;
determining at least one layout format of the text content based on a quantity of words of the text content, a quantity of the plurality of word segments, and a preset mapping relationship, wherein the preset mapping relationship is a mapping relationship between a quantity of words, a quantity of word segments, and a layout format, and the at least one layout format comprises a first layout format;
detecting a screen lock operation;
in response to the screen lock operation, displaying the text content on a first always on display interface based on the first layout format; and
when entering anon-always on display interface from the first always on display interface, and entering a second always on display interface from the non-always on display interface, displaying the text content on the second always on display interface based on a second layout format, wherein
the second layout format belongs to the at least one layout format, and the second layout format is different from the first layout format.

8. The electronic device according to claim 7, wherein the first layout format comprises a first part and a second part, and the plurality of word segments are located in the first part and the second part, wherein
when the first part and the second part are distributed from top to bottom, widths of the first part and the second part are equal; or
when the first part and the second part are distributed from left to right, heights of the first part and the second part are equal.

9. The electronic device according to claim 8, wherein a quantity of words comprised in the first part is greater than a quantity of words comprised in the second part, and a font weight value in the first part is less than a font weight value in the second part.

10. The electronic device according to claim 7, wherein the first layout format comprises a first part, a second part, and a third part, and the plurality of word segments are located in the first part, the second part, and the third part, wherein when the first part and the second part are distributed from top to bottom, and the first part and the second part are both located on the left or right side of the third part, widths of the first part and the second part are equal, and a sum of heights of the first part and the second part is equal to a height of the third part; or when the first part and the second part are distributed from left to right, and the first part and the second part are both located above or below the third part, heights of the first part and the second part are equal, and a sum of widths of the first part and the second part is equal to a width of the third part.

11. The electronic device according to claim 10, wherein a quantity of words comprised in the third part is greater than a quantity of words comprised in the first part, and a font weight value in the third part is less than a font weight value in the first part.

12. The electronic device according to claim 7, wherein a ratio of a screen width occupied by the text content laid out based on the first layout format to a screen width of the electronic device is a preset value.

13. A non-transitory computer storage medium, comprising computer instructions, wherein when the computer instructions are run on an electronic device, cause the electronic device to perform:
obtaining text content;
performing word segmentation processing on the text content to obtain a plurality of word segments;
determining at least one layout format of the text content based on a quantity of words of the text content, a quantity of the plurality of word segments, and a preset mapping relationship, wherein the preset mapping relationship is a mapping relationship between a quantity of words, a quantity of word segments, and a layout format, and the at least one layout format comprises a first layout format;
detecting a screen lock operation;
in response to the screen lock operation, displaying the text content on a first always on display interface based on the first layout format; and
when entering anon-always on display interface from the first always on display interface, and entering a second always on display interface from the non-always on display interface, displaying the text content on the second always on display interface based on a second layout format, wherein
the second layout format belongs to the at least one layout format, and the second layout format is different from the first layout format.

14. The non-transitory computer storage medium according to claim 13, wherein the first layout format comprises a first part and a second part, and the plurality of word segments are located in the first part and the second part, wherein
when the first part and the second part are distributed from top to bottom, widths of the first part and the second part are equal; or
when the first part and the second part are distributed from left to right, heights of the first part and the second part are equal.

15. The non-transitory computer storage medium according to claim 14, wherein a quantity of words comprised in the first part is greater than a quantity of words comprised in the second part, and a font weight value in the first part is less than a font weight value in the second part.

16. The non-transitory computer storage medium according to claim 13, wherein a ratio of a screen width occupied by the text content laid out based on the first layout format to a screen width of the electronic device is a preset value.

* * * * *

UNITED STATES PATENT AND TRADEMARK OFFICE
CERTIFICATE OF CORRECTION

PATENT NO. : 11,934,766 B2
APPLICATION NO. : 18/006839
DATED : March 19, 2024
INVENTOR(S) : Liu et al.

It is certified that error appears in the above-identified patent and that said Letters Patent is hereby corrected as shown below:

In the Claims

Claim 1: Column 30, Line 36: "when entering anon-always on display interface from the" should read -- when entering a non-always on display interface from the --.

Claim 7: Column 31, Line 42: "when entering anon-always on display interface from the" should read -- when entering a non-always on display interface from the --.

Claim 13: Column 32, Line 45: "when entering anon-always on display interface from the" should read -- when entering a non-always on display interface from the --.

Signed and Sealed this
Thirtieth Day of July, 2024

Katherine Kelly Vidal
*Director of the United States Patent and Trademark Office*